(12) United States Patent
Numata

(10) Patent No.: US 8,018,509 B2
(45) Date of Patent: Sep. 13, 2011

(54) IMAGE INPUT PROCESSING APPARATUS AND METHOD

(75) Inventor: Hajime Numata, Tokyo (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 12/078,973

(22) Filed: Apr. 9, 2008

(65) Prior Publication Data

US 2010/0283866 A1 Nov. 11, 2010

(30) Foreign Application Priority Data

May 18, 2007 (JP) ................................. 2007-133246

(51) Int. Cl.
*H04N 9/04* (2006.01)
*H04N 5/238* (2006.01)

(52) U.S. Cl. ........ 348/276; 348/272; 348/273; 348/278; 348/279; 348/366

(58) Field of Classification Search .................. 348/271, 348/278, 342
See application file for complete search history.

(56) References Cited

U.S. PATENT DOCUMENTS

| 6,211,521 | B1 | 4/2001 | Bawolek et al. | |
|---|---|---|---|---|
| 6,549,336 | B2 * | 4/2003 | Tamaru et al. | 359/489.09 |
| 7,006,135 | B2 * | 2/2006 | Ishimaru et al. | 348/223.1 |
| 7,773,136 | B2 * | 8/2010 | Ohyama et al. | 348/276 |
| 7,821,552 | B2 * | 10/2010 | Suzuki | 348/272 |
| 2002/0163586 | A1 * | 11/2002 | Noguchi | 348/342 |
| 2003/0058350 | A1 * | 3/2003 | Ishimaru et al. | 348/223.1 |
| 2005/0174442 | A1 * | 8/2005 | Yuyama | 348/226.1 |
| 2007/0146512 | A1 * | 6/2007 | Suzuki et al. | 348/272 |
| 2007/0285540 | A1 * | 12/2007 | Kwon et al. | 348/272 |
| 2008/0278592 | A1 * | 11/2008 | Kuno et al. | 348/222.1 |

FOREIGN PATENT DOCUMENTS

| JP | 09-166493 | 6/1997 |
|---|---|---|
| JP | 2002-142228 | 5/2002 |
| JP | 2002-521975 | 7/2002 |
| JP | 2004-032243 | 1/2004 |
| JP | 2005-006606 | 1/2005 |
| JP | 2005-295381 | 10/2005 |
| JP | 2005-354457 | 12/2005 |
| JP | 2006-094112 A | 4/2006 |

OTHER PUBLICATIONS

Japanese Office Action issued Jun. 16, 2009 for corresponding Japanese Application No. 2007-133246.
Japanese Office Action issued Mar. 3, 2009 for corresponding Japanese Application No. 2007-133246.

\* cited by examiner

*Primary Examiner* — Lin Ye
*Assistant Examiner* — John H Morehead, III
(74) *Attorney, Agent, or Firm* — Rader, Fishman & Grauer PLLC

(57) ABSTRACT

An image input processing apparatus includes: an optical band separating filter; a color filter of a four-color arrangement having an equivalence in which the sum of two colors is equivalent to one other color in the visible light region or the sum of three colors is equivalent to once or twice one other color in the visible light region; an optical sensor section that generates an imaging signal; a data separating section that separates the pixel data of the imaging signal into pieces of pixel data of four colors; an infrared separating section that performs infrared separation by a subtraction using the equivalence among the pieces of pixel data of the four colors after the separation; a first and second integration sections; a camera control processing section that determines which of the integration values from the first and second integrating sections is used.

12 Claims, 18 Drawing Sheets

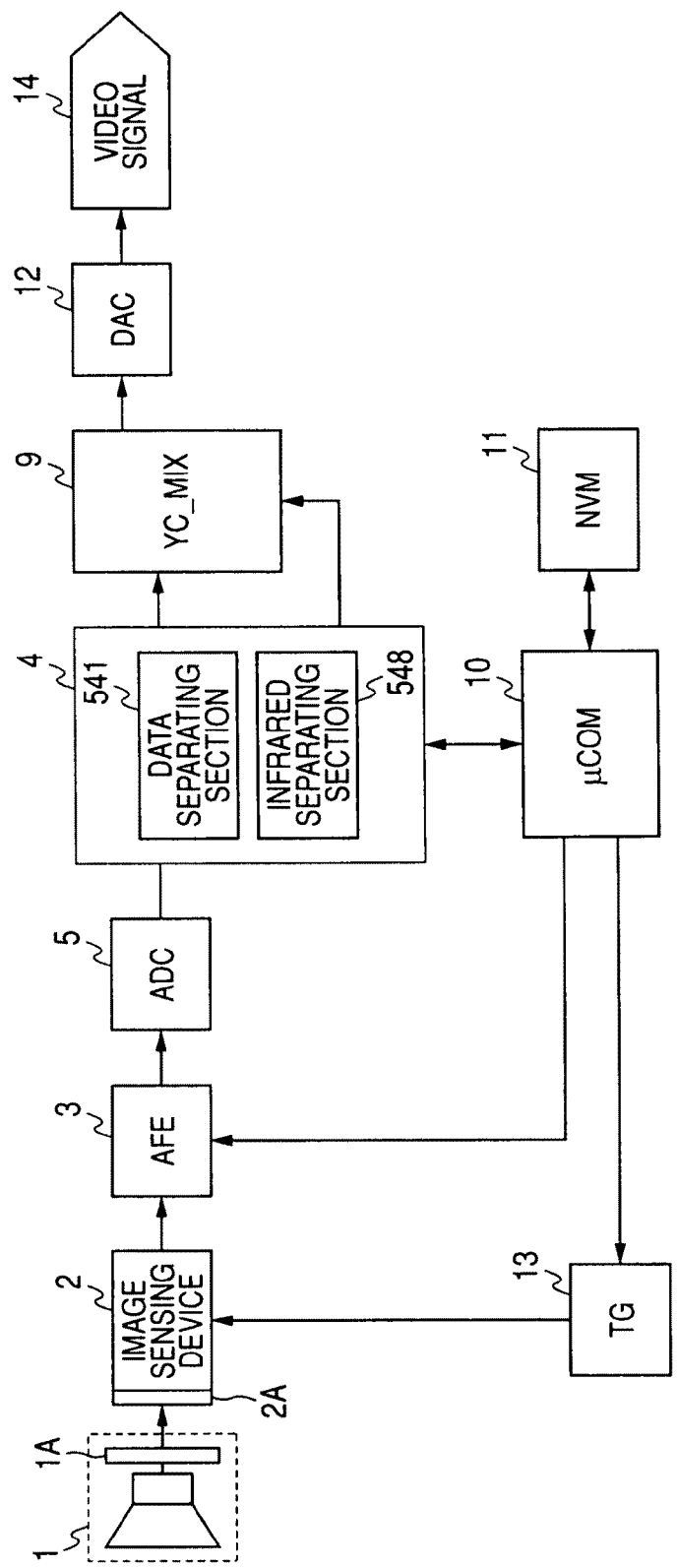
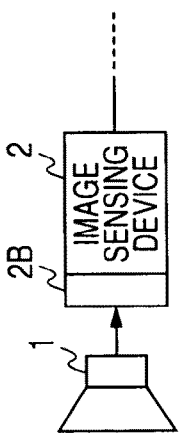
FIG. 1A
FIG. 1B

FIG. 4

| DESCRIPTION OF COLOR COMBINATION | CONCRETE EXAMPLE |
|---|---|
| 1 COMPLEMENTARY COLOR + 2 PRIMARY COLORS + WHITE | Ye, R, G, W<br>Cy, B, G, W<br>Mg, B, R, W |
| 2 COMPLEMENTARY COLORS + 1 PRIMARY COLOR + WHITE | Ye, Cy, R, W<br>Ye, Cy, B, W<br>Ye, Mg, G, W<br>Ye, Mg, B, W<br>Cy, Mg, R, W<br>Cy, Mg, G, W |
| 3 COMPLEMENTARY COLORS + WHITE | Ye, Cy, Mg, W |
| 3 PRIMARY COLORS + WHITE | R, G, B, W |
| 1 COMPLEMENTARY COLOR + 3 PRIMARY COLORS | Ye, R, G, B<br>Cy, R, G, B<br>Mg, R, G, B |
| 2 COMPLEMENTARY COLORS + 2 PRIMARY COLORS | Ye, Cy, G, R<br>Ye, Cy, G, B<br>⋮ |
| COMPLEMENTARY COLOR FAMILY | Ye, Cy, Mg, G |

INCLUDING WHITE (W) ↑

COMPUTATION
[EXPRESSIONS (1-1) TO (1-3)]

↓ COMPUTATION
[EXPRESSIONS (1-1) TO (1-3)]

⇩ COMPUTATION [EXPRESSIONS (4-1) TO (4-3), (5)]

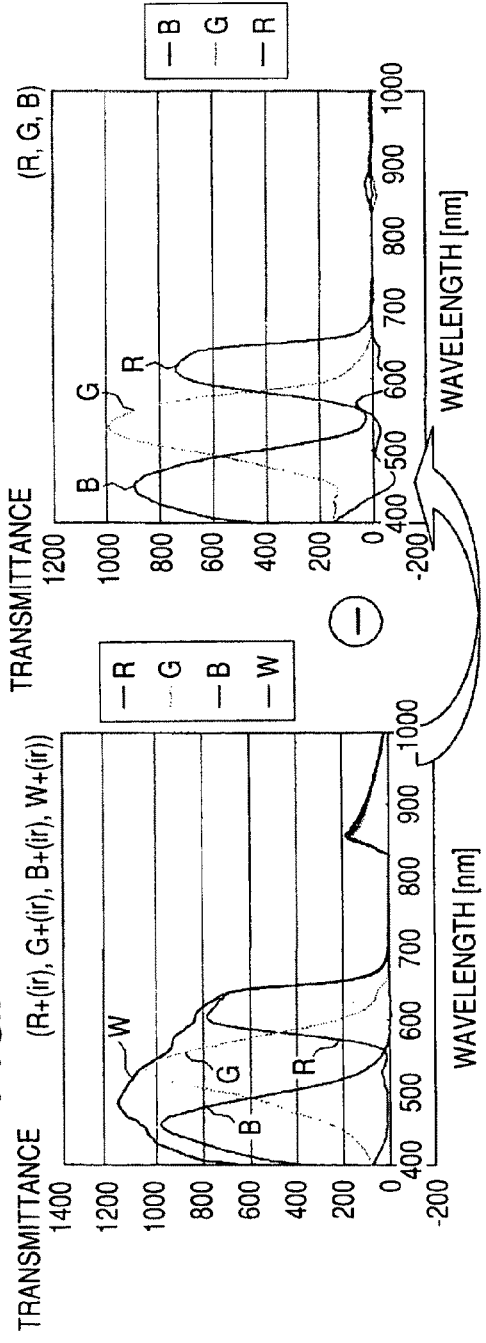
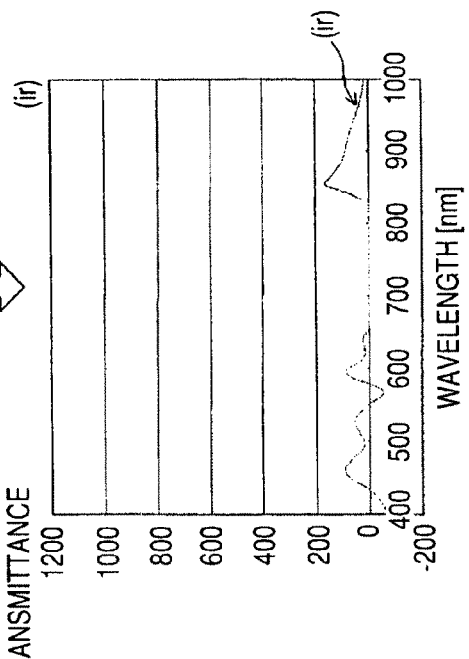
FIG. 12A1
FIG. 12A2
FIG. 12B

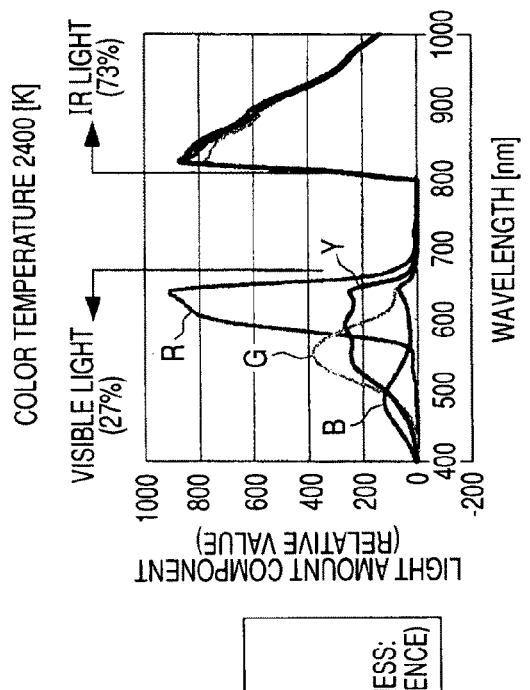
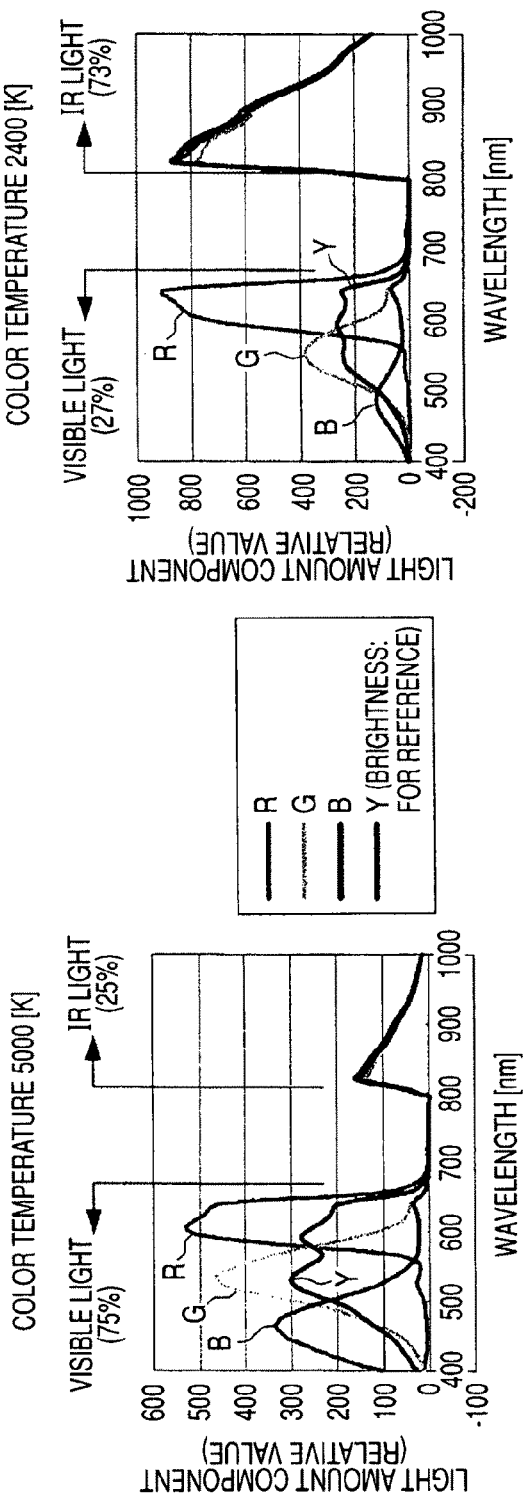
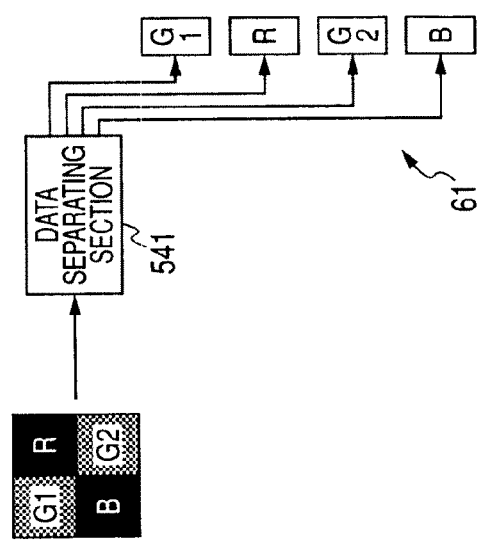

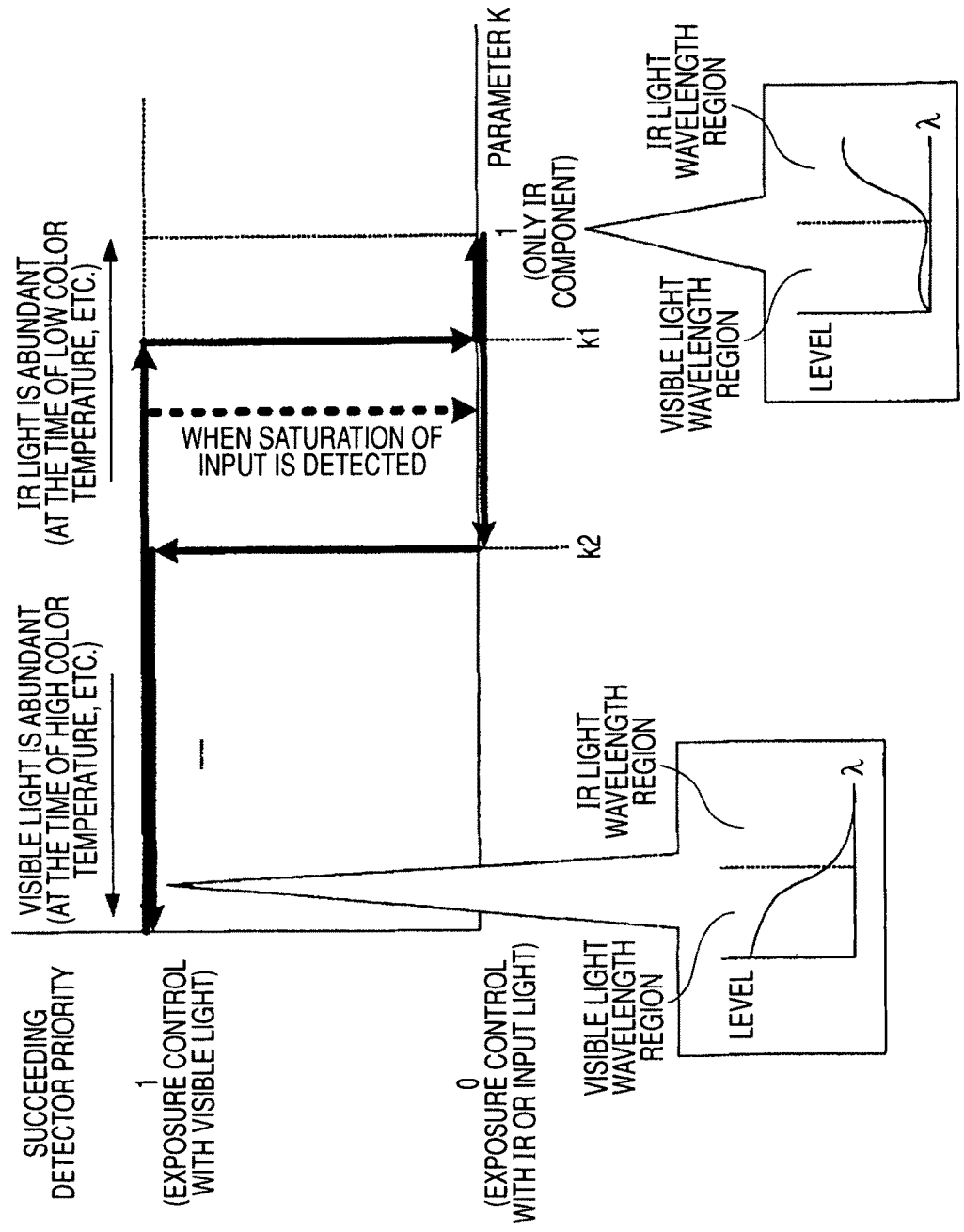

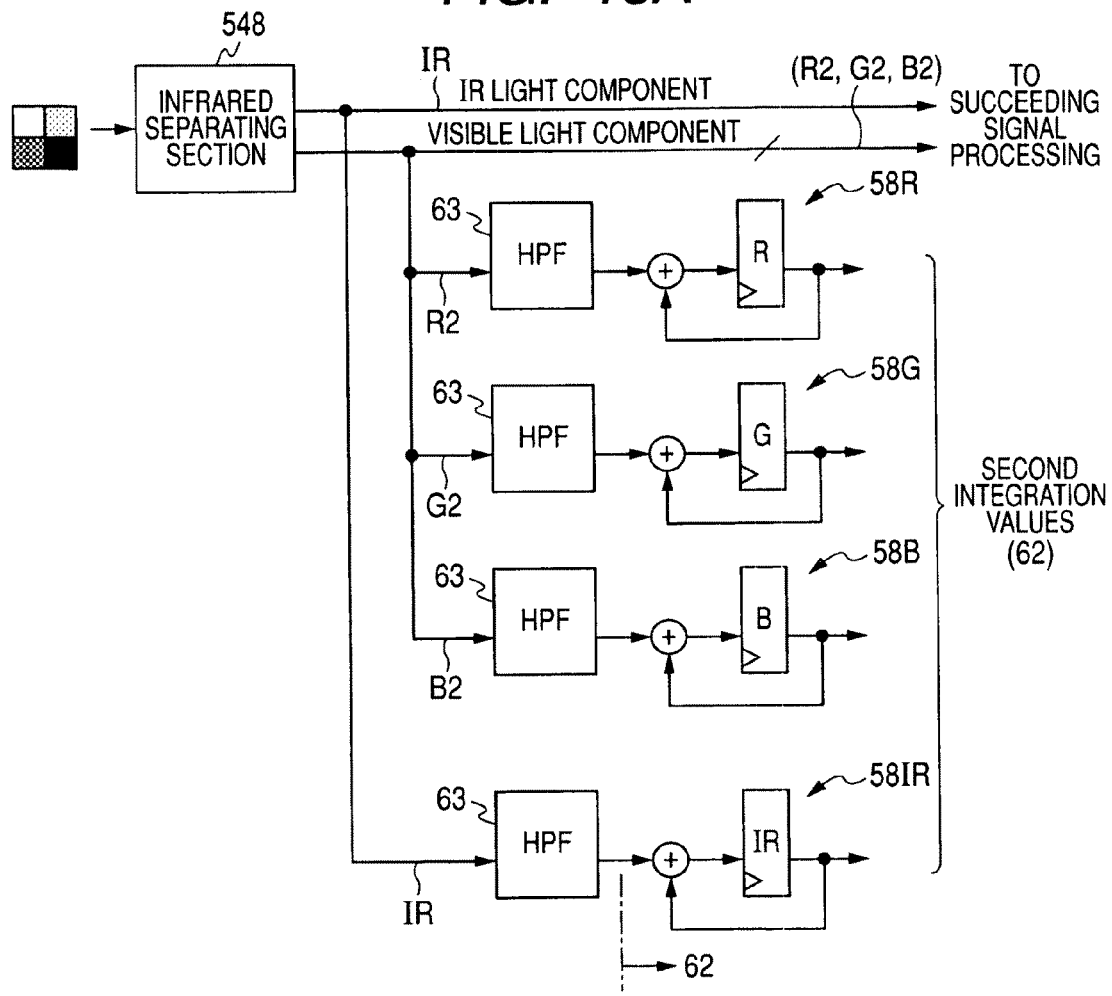

FIG. 17A
EXAMPLE OF VISIBLE LIGHT IMAGE WHEN IT IS FOGGY
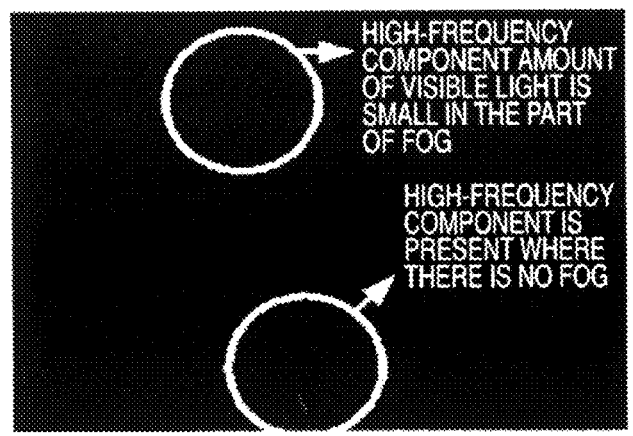
FIG. 17B
RESULT OF VISIBLE LIGHT HIGH FREQUENCY DETECTION
FIG. 17C
|  | VISIBLE | NEAR-INFRARED | FAR-INFRARED |
|---|---|---|---|
| FOGGY (VISIBILITY METER VALUE 20 m) | 10 m | 17 m | 20 m |
| FOGGY (VISIBILITY METER VALUE 50 m) | 20 m | 65 m | 70 m |
| NO FOG | > 120 m | > 120 m | > 120 m |

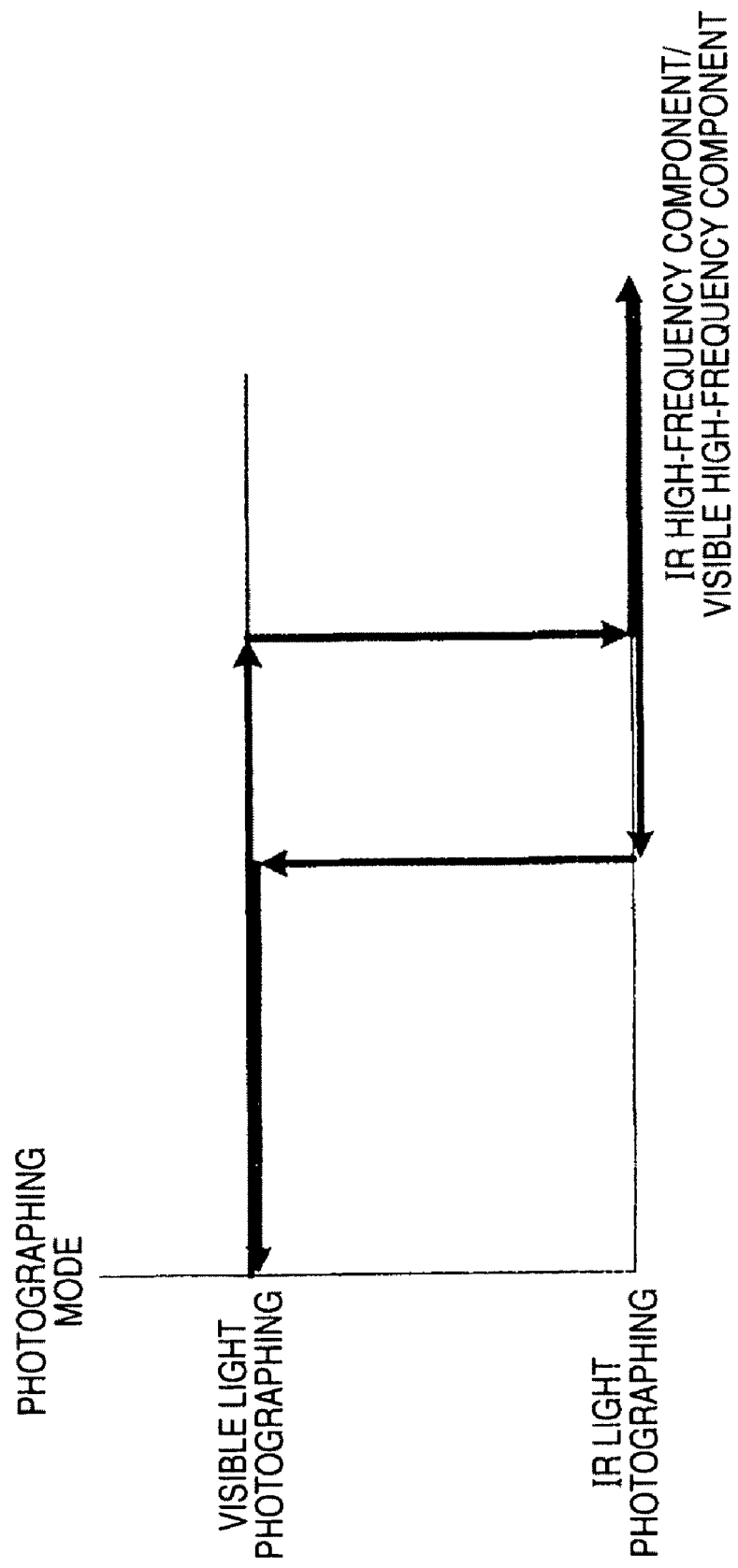

IMAGE INPUT PROCESSING APPARATUS AND METHOD

CROSS REFERENCES TO RELATED APPLICATIONS

The present invention contains subject matter related to Japanese Patent Application JP 2007-133246 filed in the Japanese Patent Office on May 18, 2007, the entire contents of which being incorporated herein by reference.

BACKGROUND OF THE INVENTION

1. Field of the Invention

The present invention relates to an image input processing apparatus and method in which light (image) from the subject containing a near infrared light component is imaged and the near infrared light component is separated from the image data of the obtained imaging signal.

2. Description of the Related Art

The human sensitivity to colors and brightness is characterized in that humans have the sensitivity in the visible light region. While defined variously, the visible light region is typically an electromagnetic wavelength region whose upper limit lies in the vicinity of 700 to 750 nm (for example, 780 nm) and whose lower limit is a little less than 400 nm (for example, 380 nm). An infrared region adjoining the visible light region is called a near infrared light region, which is an electromagnetic wavelength region from the lower limit of 700 to 800 nm to the upper limit of 1.5 to 3 μm (for example, 2.5 μm).

However, the human eye has hardly any sensitivity to the longer wavelength side of approximately 700 nm. In addition, since near infrared light has harmful effects such as degrading color reproducibility, an infrared intercepting filter (infrared cut filter) is typically provided in an optical part that controls light (image) from the subject in the image sensing device.

Since the image sensing device itself has sensitivity also to infrared light, in highly sensitive cameras for night photography or surveillance, light (image) of a wide band from visible light to infrared light is imaged.

Since the ratio of the infrared light being contained differs according to illumination (light source) such as a fluorescent light or an electric bulb and differs according to time even in the case of sunlight, whether to intercept infrared light or not is determined according to such a photographing environment change.

A technology is known in which to realize a camera that copes with any photographing environments to meet the above-described demand, visible light and infrared light are received by the same image sensing device by using a rotary type wavelength separating optical system as an input optical system (see, for example, JP-A-9-166493).

According to this technology, for example, switching between insertion and extraction of the infrared cut filter onto and from the incident optical path is made by a rotary mechanism or the like. When the infrared cut filter is inserted, a visible light color image not influenced by near infrared light or infrared light is outputted, and when the infrared cut filter is extracted, an image to which the light intensities of visible light and near infrared light are added is outputted.

An image to which near infrared light is added is suitable for object recognition although it is low in color reproducibility, and by combining a mechanism capable of obtaining this image and a mechanism emitting infrared light invisible to the human eye, a surveillance camera is realized with which clear images are obtained even at night. In the surveillance camera, the infrared cut filter is extracted from the incident optical path during the daytime.

A color correcting circuit is known that improves color reproducibility in the taken image without using the infrared cut filter when near infrared light is incident (see, for example, JP-A-2005-354457).

According to the technology described in JP-A-2005-354457, spectral sensitivity correcting means provided in a processing circuit changes the spectral sensitivity characteristic of the imaging signal to perform IR component separation, obtains the difference between the preceding and succeeding signals, and adds it up, thereby extracting the IR component. Since color reproducibility is degraded merely with the removal of the IR component, to improve color reproducibility, the spectral sensitivity correcting means matches the color data of each of red (R), green (G), and blue (B) having undergone the IR separation with the color balance of the target (for example, the color matching function of a person of normal color vision) by a matrix computation. To find the similarity between the current color and the target, the last squares method or the like is used.

With respect to the color arrangement of the color filter, an image sensing device of a four-color arrangement is known in which a repetition unit of the color arrangement is constituted by pixels of four, colors (see, for example, JP-A-2005-006066).

JP-A-2005-006066 discloses a color filter whose minimum repetition unit (pixel unit) is constituted by three primary color transmitting filters of red (R), green (G), and blue (B) and an infrared transmitting filter having sensitivity in the infrared light region and transmitting infrared light. JP-A-2005-006066 also describes that the infrared transmitting filter may be a filter of white (W).

SUMMARY OF THE INVENTION

In the spectral characteristic of light, the wavelength region of the visible light component and the wavelength region of the near infrared light component are continuous in frequency, and for this reason, it is difficult to remove only the near infrared light component without changing the visible light component by circuit means such as a low pass filter.

In JP-A-2005-354457, the removal of the IR component is performed by the "spectral sensitivity correcting means", and the magnitude of the IR component is detected before and after the removal to thereby detect whether infrared transmission photographing is performed or not.

Although the magnitude of the IR component detected by this method is incorrect for the above-mentioned reason that the frequency is continuous, it is considered sufficient for the detection of infrared transmission photographing.

Cameras are typically provided with a detector that detects the brightness of the image plane used for white balance correction and exposure control.

This detector is a circuit that adds up (integrates), for example, one image plane of input pixel signals for each color, and is provided in a position in a predetermined processing circuit before or after the separation into a luminance signal and a color signal. For example, the detector is provided behind a black level correcting section in a signal processing circuit. Then, white balance correction is performed by using the integration value of one image plane of each color outputted from the detector, or exposure compensation is performed by using the integration value of one image plane of all the colors together.

However, since the signal for which the integration values are obtained contains the IR component in addition to the visible light component, it is generally difficult to perform precise white balance correction and exposure control unless the magnitude or the ratio of the IR component in the integration values is found.

The method and the means described in JP-A-2005-354457 is applicable as the means for finding the magnitude of the IR component.

However, although the method and the means described in JP-A-2005-354457 are useful for roughly detecting the magnitude of the IR component for a purpose such as finding the presence or absence of infrared transmission photographing, they are inadequate for practical use for camera control processings that may require data concerning brightness for precise control such as white balance correction and exposure control, for the reason that the obtained magnitude of the IR component lacks precision.

It is unclear how the "spectral sensitivity correcting means" described in JP-A-2005-354457 removes the IR component. However, it is typical to use a filter that transmits light on the shorter wavelength side of the boundary between the visible light region and the near infrared light region, and when this is used, since the visible light region and the near infrared light region are continuous, it occurs that part of the visible light is removed as well or some of the IR component remains. Thus, the removal of the IR component is not easy. Therefore, it is difficult to obtain the precise magnitude or ratio of the IR component.

Thus, it is desirable to realize an image input processing apparatus capable of precisely and directly separating the IR component from the pixel data by a simple computation and of precisely performing a predetermined camera control processing by adaptively detecting the integration value according to whether or not it is necessary to precisely find the magnitude of the IR component or the magnitude of the color component from which the IR component has been removed.

An image input processing apparatus according to an embodiment of the present invention is provided with an optical band separating filter, a color filter, an optical sensor section, a data separating section, an infrared separating section, a first integrating section, a second integrating section, and a camera control processing section.

The optical band separating filter intercepts a predetermined wavelength band of near infrared light, and transmits bands on the shorter and longer wavelength sides of the predetermined wavelength band.

The optical sensor section images light (image), from the subject, having passed through the optical band separating filter and the color filter, and generates an imaging signal. The (repetition basic unit of the) color filter adopts a four-color arrangement having an equivalence in which the sum of two colors is equivalent to one other color in the visible light region or the sum of three colors is equivalent to once or twice one other color in the visible light region.

The data separating section separates the pixel data, corresponding to the four-color arrangement, of the imaging signal into pieces of pixel data of four colors.

The infrared separating section separates the near infrared light component, in the longer wavelength side band, separated by the optical band separating filter, from the pixel data by a subtraction using the equivalence in the visible light region based on the four-color arrangement among the pieces of pixel data of the four colors after the separation.

The first integrating section integrates, for each color, a plurality of pieces of pixel data that are outputted from the data separating section and have not been inputted to the infrared separating section yet. The second integrating section integrates, for each color, a plurality of pieces of pixel data outputted from the infrared separating section.

The camera control processing section compares a first integration value of each color from the first integrating section with a second integration value of each color from the second integrating section, and performs a camera control processing suitable for each of an image containing a relatively large amount of infrared light component and an image containing a relatively small amount of infrared light component, based on a result of the comparison.

According to another embodiment of the present invention, preferably, the first and second integrating sections each include a color integrating section that obtains a color integration value for each color, and the second integrating section includes the color integrating section that obtains the color integration value for each color and an IR integrating section that obtains an integration value (IR integration value) of the near infrared light component extracted by the infrared separating section.

According to another embodiment of the present invention, preferably, the camera control processing section calculates a parameter related to the magnitude of the near infrared light component or the ratio of the near infrared light component contained in the pixel data based on the IR integration value, and determines from which of the first and second integrating sections the color integration value used for the camera control processing is obtained, according to the parameter. At this time, the camera control processing section may mix the two color integration values obtained from the first and second integrating sections at a ratio corresponding to the parameter, and use the mixture of the color integration values as the color integration value used for the camera control processing.

In the above-described structure, the image input processing apparatus of the embodiments of the present invention has the optical band separating filter, and the optical band separating filter intercepts the predetermined wavelength band of near infrared light for the incident light, and transmits the bands on the shorter and longer wavelength sides of the predetermined wavelength band.

In the color spectral characteristic of the imaging signal outputted from the optical sensor section, normally, the sensitivity characteristic is equivalent even when the color is different on the longer wavelength side of the wavelength where near infrared light is present. It is considered that this is attributable to a physical property limitation (for example, saturability) of the semiconductor material of the device and the filter material.

On the other hand, the human eye has hardly any sensitivity to not less than approximately 700 nm even in the near-infrared light region. The lower limit of the frequency where the sensitivity characteristic is equivalent even when the color is different is higher than 700 nm, and in the frequency region between these two, the sensitivity differs among the colors.

In the embodiments of the present invention, the optical band separating filter separates the incident light into two bands, for example, by intercepting the specific wavelength band to which the human eye has hardly any sensitivity and where the sensitivity differs among the colors as mentioned above and transmitting the bands on the shorter and longer wavelength sides of the predetermined wavelength band. By well using the band separating function, the near-infrared light component is equivalent among the colors on the longer wavelength side band after the passage of the optical band separating filter.

The light having passed through the optical band separating filter is made incident on the color filter of the image sensing device. The color filter has a four-color arrangement as described above. The light having passed through the color filter is photoelectrically converted by the optical sensor section, and the imaging signal is outputted. The imaging signal is separated into pieces of pixel data of the four colors by the data separating section, and then, inputted to the infrared separating section.

The infrared separating section performs a computation among the pieces of pixel data of the four colors. At this time, the infrared separating section separates the near-infrared light component on the longer wavelength side region from the pixel data by performing the subtraction using the characteristic of the four-color arrangement of the color filter, that is, the "equivalence in which the sum of two colors is equivalent to one other color in the visible light region or the sum of three colors is equivalent to once or twice one other color in the visible light region" and the structure that can make the near-infrared light component equivalent on the longer wavelength side of the two bands after the separation.

The infrared separating section may separate and output the near-infrared light component, or may output three primary color data from which the near-infrared light component has been removed.

The separation of the near-infrared light component is provided by equivalent visible light components offsetting each other by a subtraction performed between two color combinations (combinations of one color and two colors, and one color and three colors) exhibiting the above-mentioned equivalence. The three primary color data from which the near-infrared light component has been removed is provided by performing a subtraction so that visible light components offset each other between one color and two or three colors.

The pixel data from which the near-infrared light component is accurately separated by the computation in this manner is integrated by the second integrating section, and the second integration value is outputted from the second integrating section.

On the other hand, the previous pixel data, containing the near-infrared light component, that has not been undergone the infrared separation yet is integrated by the first integrating section, and the first integration value is outputted from the first integrating section.

The first and second integration values are inputted to the camera control processing section, and compared with each other for each color (here, the comparison may be made for at least one color).

Then, the camera control processing section determines one of the first and second integration values based on the result of the comparison (or calculates a new integration value which is a mixture of the first and second integration values at a predetermined ratio), and performs a predetermined camera control processing based on the determined (or calculated) integration value.

In an image input processing apparatus according to another embodiment of the present invention, the color filter is a color filter of four complementary color family colors (Ye, Cy, Mg, G) not having the above-mentioned equivalence. In this case, the infrared separating section separates the near infrared light component, in the longer wavelength side band, separated by the optical band separating filter, from the pixel data by performing the subtraction among pieces of pixel data of the four colors after the separation. The operations of the first and second integrating sections and the camera control processing section are similar to the above-described ones.

An image input processing method according to an embodiment of the present invention includes the steps of: intercepting a predetermined wavelength band of near infrared light for incident light, and transmitting bands on the shorter and longer wavelength sides of the predetermined wavelength band; selecting a color of the incident light by a color filter of a four-color arrangement having an equivalence in which the sum of two colors is equivalent to one other color in the visible light region or the sum of three colors is equivalent to once or twice one other color in the visible light region, and imaging the light having undergone the color selection, with a pixel for each color; separating an imaging signal obtained by the imaging, into pieces of pixel data of colors; integrating the pieces of pixel data of the colors obtained by the separation, for each color; separating the near infrared light component in the longer wavelength side band by a subtraction using the equivalence in the visible light region based on the four-color arrangement among the pieces of pixel data of the colors; integrating the pieces of pixel data having undergone the infrared light separation, for each color; comparing a first integration value of each color obtained by the step of integrating the pieces of pixel data of the colors obtained by the separation with a second integration value of each color obtained by the step of integrating the pieces of pixel data having undergone the infrared light separation; and performing a camera control processing suitable for each of an image containing a relatively large amount of infrared light component and an image containing a relatively small amount of infrared light component, based on the result of the comparison.

According to the embodiments of the present invention, an advantages is obtained that a predetermined camera control processing can be accurately performed by adaptively detecting the integration value according to whether or not it is necessary to precisely find the magnitude of the color component from which the near-infrared light component has been removed (or the near-infrared light component itself).

BRIEF DESCRIPTION OF THE DRAWINGS

FIGS. 1A and 1B are block diagrams of a camera incorporating a pixel signal processing circuit according to an embodiment of the present invention;

FIG. 4 is a table classifying color combinations in a four-color arrangement;

FIG. 12A1 is a graph showing the spectral characteristics after data separation;

FIG. 12A2 is a graph showing the spectral characteristics of the primary color family data obtained by a computation;

FIG. 12B is a graph showing the spectral characteristic of an equivalent IR component (ir) extracted by subtracting FIG. 12A2 from FIG. 12A1;

FIGS. 13A and 13B are graphs of the color spectral characteristics when the color temperature of the light source is 5000 K and when it is 2400 K, respectively;

FIG. 13C is a block diagram of a first integrating section provided on the preceding stage of the infrared separation;

FIG. 15 is a view schematically showing a priority determining method of a camera control processing performed by using the first and second integrating sections 61 and 62;

FIG. 16A is a view showing a structure for high-frequency component detection;

FIG. 16B is a view showing a filter coefficient example;

FIGS. 17A and 17B are views showing examples of a visible light image and a high frequency detection image when it is foggy;

FIG. 17C is a table showing the relation between the presence or absence of fog and visibility meter values, and the visibility; and FIG. 18 is a view schematically showing a priority determining method of a camera control processing including high frequency detection.

DESCRIPTION OF PREFERRED EMBODIMENTS

Figure 2A:
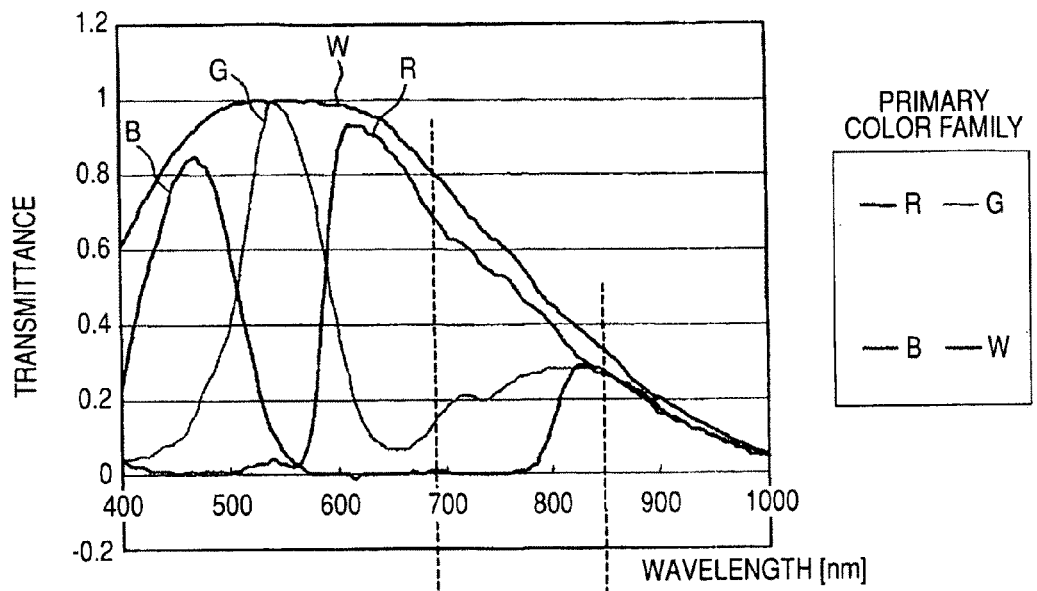
FIG. 2A is a graph showing the spectral characteristic of a primary color family CCD including a white (W) pixel.

Hereinafter, an embodiment of the present invention will be described with reference to the drawings.

First, a highly precise infrared separation on which the embodiment of the present invention is predicated will be described. The infrared separation is capable of removing the near infrared light component (IR component) from the input signal (imaging signal), extracting the IR component and outputting it, and both, that is, outputting both a signal from which the IR component has been removed and the IR component.

Although details will be described later, a characteristic of the embodiment of the present invention is that an integrating section is provided on each of the signal input and output sides of an infrared separating section. For concrete explanation, first, a camera capable of performing color correction by the infrared separation will be described below, and then, the connection of the integrating sections to the infrared separating section and the operation will be described.

The infrared separation is performed for various purposes. The scope of application of the invention is not limited to the provision of the infrared separation only for color correction.

<<Camera Having Infrared Separation Function>>

FIGS. 1A and 1B are block diagrams of a camera incorporating a pixel signal processing circuit according to the embodiment of the present invention.

The camera corresponds to a mode of the "image input processing apparatus" of an embodiment of the present invention. The camera may be any of a video camera mainly for taking moving images, a digital still camera mainly for taking still images, and other electronic apparatuses having the function of a video camera or a digital still camera.

The illustrated camera is provided with: an optical part 1 including a lens and an optical filter; an image sensing device 2; an analog front end (AFE) circuit 3 that processes an analog pixel signal; an AD converter (ADC) 5 that A/D converts the analog pixel signal into a digital signal, and outputs it to various signal processing sections as a digital video signal; a signal processing section 4; a mixing circuit (YC_MIX) 9; and a DA converter (DAC) 12 that D/A converts the video signal having undergone various signal processings into an analog signal, and outputs it as a video signal 14.

The optical part 1 is a part in which a lens, a diaphragm, and the like are accommodated in a lens barrel. The optical part 1 is capable of focus control, and diaphragm control for exposure control. A diaphragm driving section for exposure control, a driving section for automatic focusing, and a control circuit for these driving sections are also included in the optical part 1.

The image sensing device 2 is a CCD sensor or a CMOS image sensor. The image sensing device 2 is fixed in the camera body so that it can image the light (image) from the subject incident through the optical part 1, on its own imaging plane. The image sensing device 2 has a pixel array in which a multiplicity of pixels of the optical sensor are arranged in matrix, and a color filter 2A or an on-chip and multilayer filter 2B which is a set of several adjoining optical sensors (pixel unit) and formed in a predetermined arrangement on the light incident side of the imaging plane of the pixel array.

The camera shown in FIGS. 1A and 1B includes an optical band separating filter.

The optical band separating filter has a band spectral characteristic of intercepting a predetermined wavelength band of near infrared light and transmitting the bands on the shorter and longer wavelength sides of the predetermined wavelength band.

As shown in FIG. 1A, the optical band separating filter 1A may be provided separately from the image sensing device 2, for example, within the optical part 1. In this case, the color filter 2A is formed on the light incident side of the light receiving portion of the image sensing device 2.

Alternatively, as shown in FIG. 1B, a color filter and an optical band separating filter may be integrally formed in the on-chip and multiplayer filter 2B formed on the light incident side of the light receiving portion of the image sensing device 2.

Figure 2B:
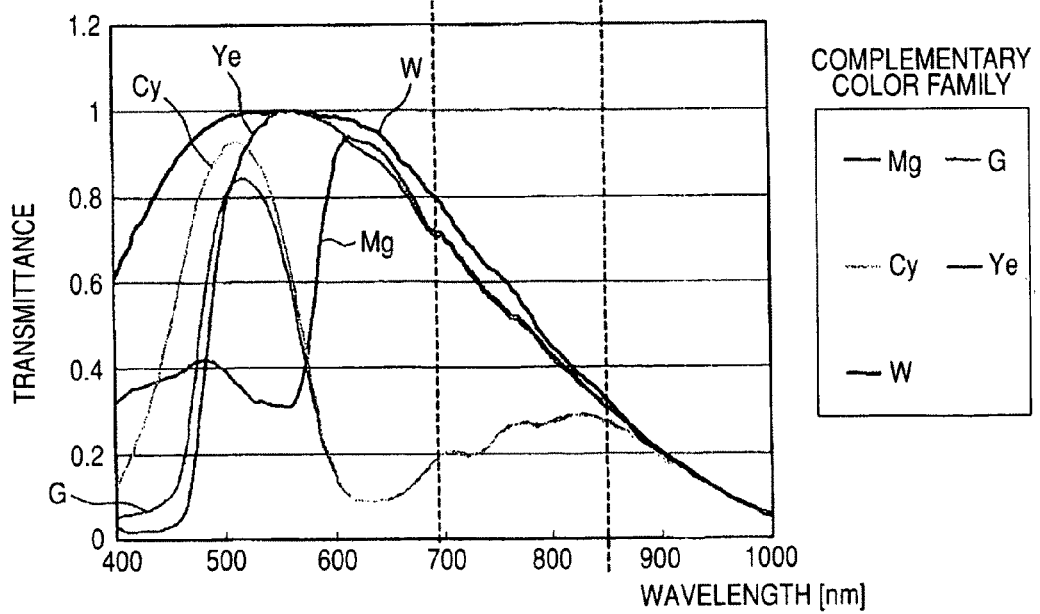
FIG. 2B is a graph showing the spectral characteristic of a complementary color family CCD including a white (W) pixel.

FIG. 2A shows the spectral characteristic of a primary color family CCD including a white (W) pixel. FIG. 2B shows the spectral characteristic of a complementary color family CCD including a white (W) pixel. In these graphs, the horizontal axis represents the wavelength of the incident light, and the vertical axis represents the relative transmittance when the peak of the white (W) pixel output is "1".

It is apparent from FIGS. 2A and 2B that the image sensing device has sensitivity to each of red (R), green (G), blue (B), and white (W) also in the region of frequencies higher than the lower limit (700 to 800 nm) of the near infrared light region. While the definition of the near infrared light region varies, a region above the vicinity of 750 to 780 nm is typically regarded as the near infrared light region.

In the primary color family CCD whose spectral characteristic is shown in FIG. 2A, the sensitivities to red (R), green (G), blue (B), and white (W) become substantially uniform on the longer wavelength side of the vicinity of the region where the frequency becomes slightly above 800 nm, for example, above 820 nm.

On the contrary, in the complementary color family CCD whose spectral characteristic is shown in FIG. 2B, the sensitivities to Ye (yellow), Cy (cyan), Mg (magenta), G (green), and W (white) become substantially uniform on the longer wavelength side of the vicinity of the region where the wavelength is 850 nm.

While it is because of the physical property of the semiconductor that the sensitivities to the colors become uniform on the longer wavelength side in the image sensing device as mentioned above, the lower limit wavelength of the region where the sensitivities to the colors are uniform differs according to whether the device is a primary color family device or a complementary color family device as shown in the figures or according to the kind of the image sensing device.

It is typical that an infrared cut filter is disposed as an optical part on the light incident side of the image sensing device. In order to attenuate, to substantially close to zero, the transmittance of the wavelength range including the boundary between the visible light region and the near infrared light region above the vicinity of 700 nm to which the human eye has hardly any sensitivity, the cut-off wavelength of the infrared cut filter is set at the vicinity of 650 nm.

The present embodiment does not use such an infrared cut filter but uses the optical band separating filter 1A or the like as shown in FIG. 1A.

Figure 3A:
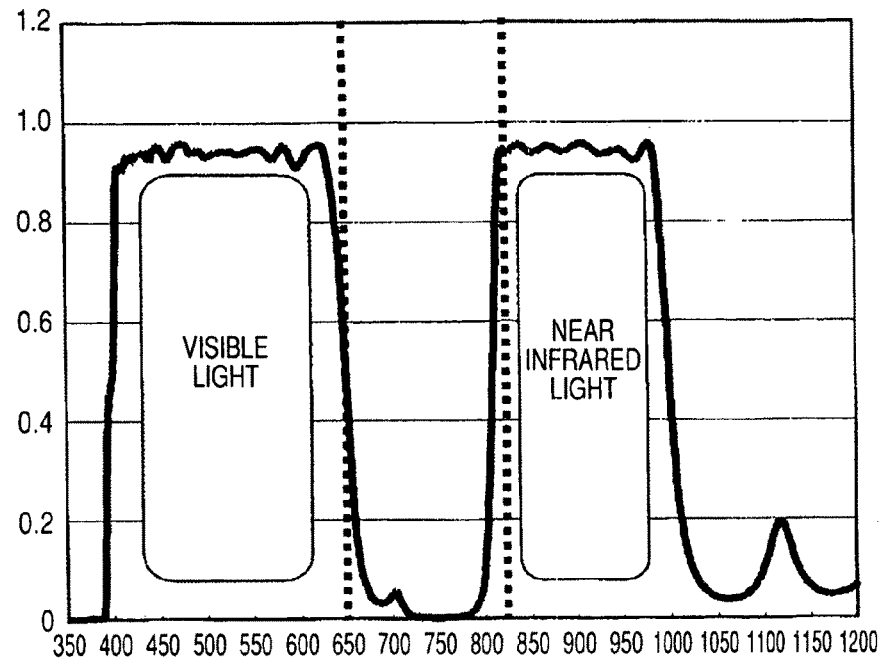
FIGS. 3A and 3B are graphs showing examples of characteristics of optical band separating filters provided as an optical part and as an on-chip part, respectively.
Figure 3B:
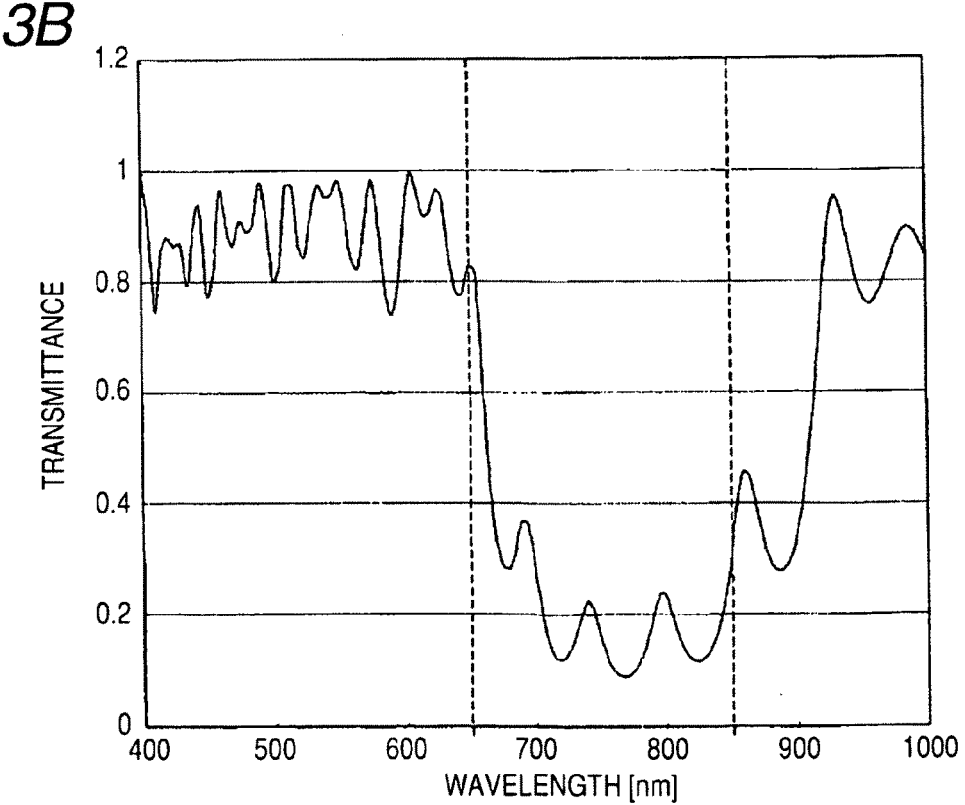

FIG. 3A shows the spectral characteristic of the optical band separating filter 1A (FIG. 1A) provided separately from the image sensing device 2 as an optical part. FIG. 3B shows the spectral characteristic of the optical band separating filter (FIG. 1B) included in the on-chip and multilayer filter 2B of the image sensing device 2.

In these graphs, the horizontal axis represents the wavelength (nm), and the vertical axis represents the transmittance (1 represents 100% transmission).

In the case of the optical band separating filter 1A as an optical part, as shown in FIG. 3A, when the cut-off wavelength is defined at a position where the transmittance is 20 to 30 percent lower than 1, the wavelength range of the intercepted band is approximately 650 to 820 nm. The shorter wavelength side of the intercepted band is the visible light passing band, and the longer wavelength side thereof is the near infrared light passing band. When light having passed through the optical band separating filter 1A of this spectral characteristic is actually received by the image sensing device 2, light of the intercepted bandwidth, for example, from the vicinity of 700 nm to the vicinity of 820 nm is intercepted.

The wavelength range of this intercepted band corresponds to the lower limit (820 nm) of the long wavelength region where the sensitivity is uniform among the colors of the primary color family CCD shown in FIG. 2A.

In the case of the on-chip and multilayer filter, as shown in FIG. 3B, the periodical fluctuation is large because of the influence of the multilayer film, and a steep intercepted band is difficult to be formed. Normally, in the on-chip and multilayer filter, the longer wavelength side is difficult to control, and as shown in the figure, the intercepted band on the longer wavelength side is in the vicinity of 900 nm. However, when light having passed through the optical band separating filter 1A of this spectral characteristic is actually received by the image sensing device 2, light on the inner side of the intercepted band, for example, from the vicinity of 700 nm to the vicinity of 850 nm is intercepted. That is, the wavelength range of the intercepted band corresponds to the lower limit (850 nm) of the long wavelength region where the sensitivity is uniform among the colors of the complementary color family CCD shown in FIG. 2B.

The spectral characteristics of FIGS. 3A and 3B are designed in accordance with the image sensing device being used. That is, the filter spectral characteristics are designed so that the near infrared light component of not less than the vicinity of 820 nm or not less than the vicinity of 850 nm can pass in the actual device with attention paid to the fact that the sensitivity is substantially uniform among the colors on the longer wavelength side of not less than the vicinity of 820 nm or not less than the vicinity of 850 nm in the spectral characteristics of the image sensing device shown in FIGS. 2A and 2B.

FIGS. 2A, 2B, 3A, and 3B are each an example, and when the spectral characteristic of the device is changed, the characteristic may be changed so as to be the characteristic of the optical band pass filter suitable therefor. While details of the color arrangement of the color filter will be described later, when both primary color family pixels and complementary color family pixels are present, the filter spectral characteristic is designed so that the near infrared light component can pass at not less than the vicinity of 850 nm corresponding to the complementary color family pixels whose wavelength lower limit where the sensitivities to the colors are uniform is higher.

When the image sensing device 2 is a CCD sensor, as shown in FIG. 1A, a timing generator (TG) 13 is connected to the image sensing device 2. The image sensing device 2 can be fed with a clock signal, a vertical synchronizing signal, and a horizontal synchronizing signal from the TG 13. When the image sensing device 2 is a CCD, a transfer pulse synchronizing with the vertical synchronizing signal and the horizontal synchronizing signal is also fed from the TG 13.

The TG 13 is a circuit that generates these signals for timing control from a non-illustrated system clock signal by being controlled by a microcomputer 10. Various operations of the image sensing device 2 such as the transfer operation and the shutter speed change are controlled by the signals for timing control.

When the image sensing device 2 is a CMOS sensor, the function of the TG 13 may be provided in the image sensing device 2.

In the color filter 2A, at least four colors are assigned to each optical sensor (pixel). In the embodiment of the present invention, a set of several adjoining pixels serving as a repetition basic unit of the pixel array is called a pixel unit. In the present embodiment, four or more colors are arranged in one pixel unit. While the provision of four or more colors is a requirement since at least four colors are necessary for the infrared separation computation described later, four-color arrangement is desirable because if the number of colors is unnecessarily large, the footprint of the pixel unit is large and resolution is decreased. The following description is premised on four-color arrangement. Color combinations and how the color data is used (computation method) will be described later in detail.

The AFE circuit 3 fed with the pixel signal (analog signal) from the image sensing device 2 performs processings to be performed on the analog signal such as the removal of reset noise by correlated double sampling (in the case of a CCD), the removal of other noises, and amplification.

The ADC 5 converts the processed analog signal into a digital signal of predetermined bits, for example, 8 or 10 bits. This digital signal includes a pixel signal array having a gradation value of the predetermined bits for each pixel. For example, the digital signal outputted from the ADC 5 includes a pixel signal array in which an A pixel signal and pixel signals of other colors are alternately arranged.

The signal processing section 4 includes a data separating section 541 and an infrared separating section 548 as sections that process the digital imaging signal from the ADC 5.

The data separating section 541 is a circuit that separates the pixel data corresponding to the four-color arrangement of the digital imaging signal, into pieces of pixel data of the four colors.

The infrared separating section 548 is a circuit that separates the near infrared light component in the longer wavelength side band separated by the optical band separating filter, from the pixel data by a subtraction based on the four-color arrangement among the separated pieces of pixel data of the four colors.

More detailed functions and operations of the data separating section 541 and the infrared separating section 548 will be described later.

The signal processing section 4 may be, for example, formed into an IC as a semiconductor chip or provided as a module or a mount board where a plurality of parts are mounted, and incorporated into the camera. The signal processing section 4 is connected between the ADC 5 and the DAC 12, and performs various signal processings in addition to the data separation and the infrared separation. Examples of the various signal processings include signal amplification, noise reduction (NR) processing, separation into a luminance signal and a color signal, luminance signal processing, and color signal processing. The mixing circuit 9 that mixes the processed luminance and color signals is connected between the signal processing section 4 and the DAC 12. The signal processing section 4 and the mixing circuit 9 may be integrated into the signal processing section 4, or may be formed into an IC or a module.

Next, color combinations of the four-color arrangement and the contents of the computation performed by the infrared separating section 548 for each combination will be described.

Figure 5:
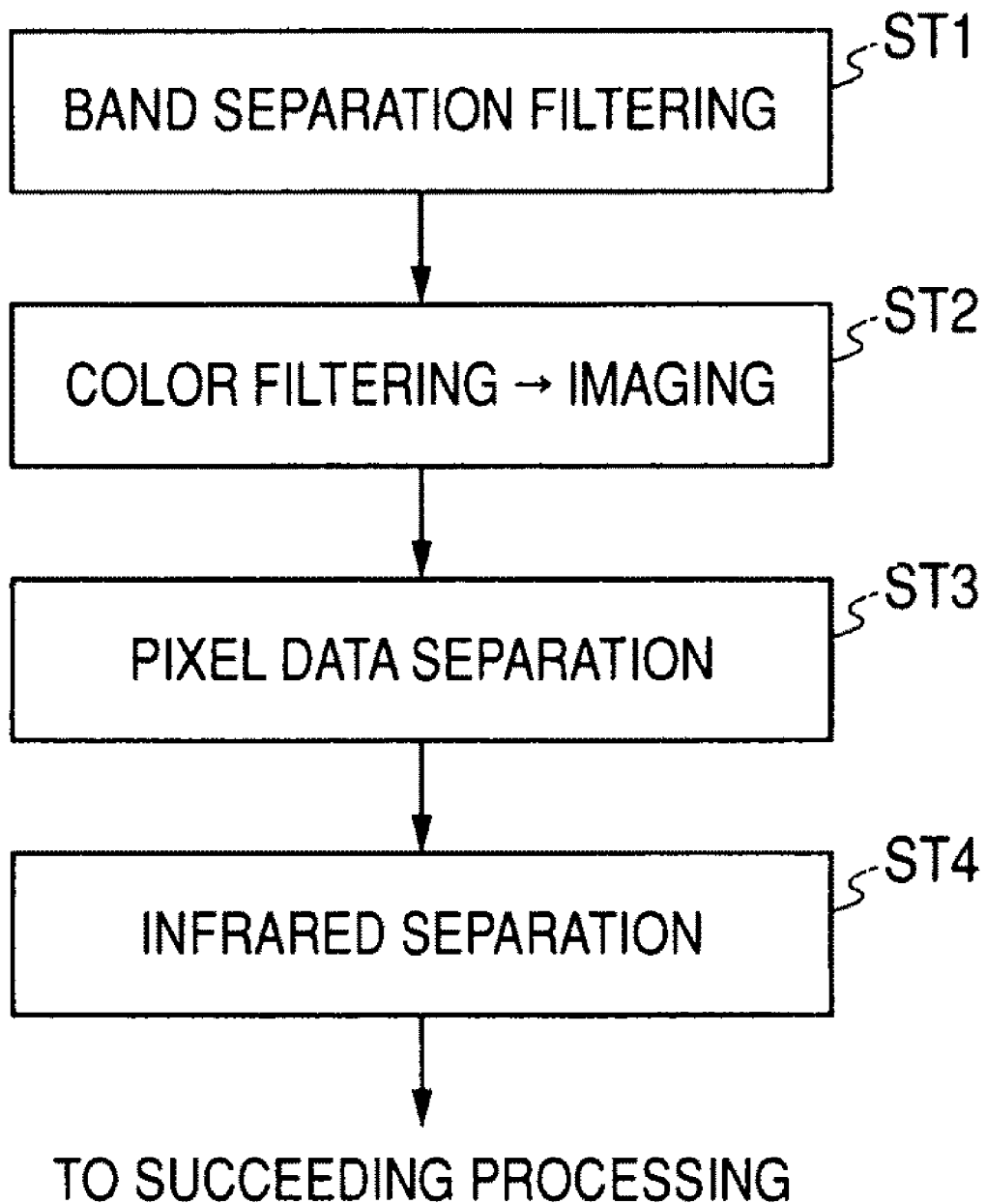
FIG. 5 is a flowchart showing the procedure of an image input processing method related to the embodiment.

As described below, the infrared separating section 548 which merely performs a simple computation including subtractions may be realized by the microcomputer 10 and a program function or may be a specifically designed circuit. However, it is undesirable that the processing load on the microcomputer 10 be increased, and when the processing is performed by the microcomputer 10, it is an interruption processing which is difficult to synchronize. Therefore, it is preferable to realize the infrared separating section 548 as a logic circuit including a subtracter or the like. Since the circuit of the infrared separating section 548 merely performs simple (additions and) subtractions, computational expressions are substituted for a block diagram without a circuit diagram being shown in the following description:

FIG. 4 shows a table classifying the color combinations of the four-color arrangement. FIG. 5 is a flowchart showing the processing procedure for color separation.

At step ST1 shown in FIG. 5, light (image) from the subject is separated into a visible light band on the lower wavelength side and a near infrared light band on the longer wavelength side by the optical band separating filter 1A of FIG. 1A or the optical band separating filter in the on-chip and multilayer filter 2B of FIG. 1B (see FIGS. 3A and 3B).

Then, at step ST2 shown in FIG. 5, by the color filter 2A of the four-color arrangement (FIG. 1A) or the color filter of the four-color arrangement in the on-chip and multilayer filter 2B, color filtering for color separation is performed, and imaging is performed by the light receiving portion of the image sensing device 2.

By the imaging, an imaging signal containing the pieces of pixel data in the order corresponding to the four-color arrangement is outputted from the image sensing device 2.

Then, the imaging signal undergoes a predetermined analog signal processing at the AFE circuit 3 shown in FIG. 1A, is converted into a digital imaging signal (series code representing a gradation value of predetermined bits) by the ADC 5, and is inputted to the signal processing section 4.

After undergoing a necessary processing at the signal processing section 4, at step ST3 shown in FIG. 5, the digital imaging signal is separated into pieces of pixel data of the colors by the data separating section 541 (FIG. 1A). That is, in the four-color arrangement, pieces of pixel data of the four colors are outputted in parallel from the data separating section 541.

At step ST4 shown in FIG. 5, infrared separation is performed by performing a predetermined computation among the pieces of pixel data of the four colors. The meaning of the "infrared separation" referred to here includes extracting the near infrared light component (IR component) from the pixel data and the following three: "outputting only the IR component"; "outputting only the color data from which the IR component has been removed"; and "outputting both". Which of the three is included in the meaning depends on the contents of the processing using the data having undergone the infrared separation. For example, when the infrared separation is performed to find the magnitude of the IR component, only the IR component is outputted. On the other hand, for example, when the IR component is removed to perform color correction, only the color data from which the IR component has been removed is outputted. Moreover, for example, when the IR component is used for another purpose in addition to color correction, the IR component and the color data from which the IR component has been removed are separately outputted.

In the above-described processing method, various color combinations as shown in FIG. 4 are considered in the color filtering performed at step ST2.

Here, the IR component contained in the pixel signal which, strictly speaking, differs among the colors can be considered substantially the same (equivalent) in the near infrared light band separated by the optical band separating filter as mentioned above, and this equivalent IR component contained in the pixel signal is represented by "(ir)". The complementary color indicates any of Ye, Cy, and Mg.

In the color combinations shown in FIG. 4, all but a complementary color family "Ye, Cy, Mg, and G" satisfy the equivalence of a definition that "the sum of two colors is equivalent to one other color in the visible light region or the sum of three colors is equivalent to once or twice one other color in the visible light region". The color combinations listed in FIG. 4 and the equivalence, and the computation performed in the infrared separation for the color combinations will be described in order.

<One Complementary Color, Two Primary Colors and White>

One complementary color, two primary colors, and one white (W) constitute the four-color arrangement. Specifically, as shown in FIG. 4, this combination includes the following three patterns: "Ye, R, G, W", "Cy, B, G, W", and "Mg, B, R, W".

For example, the pattern "Ye, R, G, W" satisfies the above-mentioned equivalence since the group of the (R+(Ir)) data and the (G+(ir)) data after the pixel data separation and the (Ye(=R+G)+(ir)) data "meet the requirement that the sum of two colors is equivalent to one other color in the visible light region". Likewise, the other two patterns meet this requirement and satisfy the equivalence.

Figures 6A, 6B:
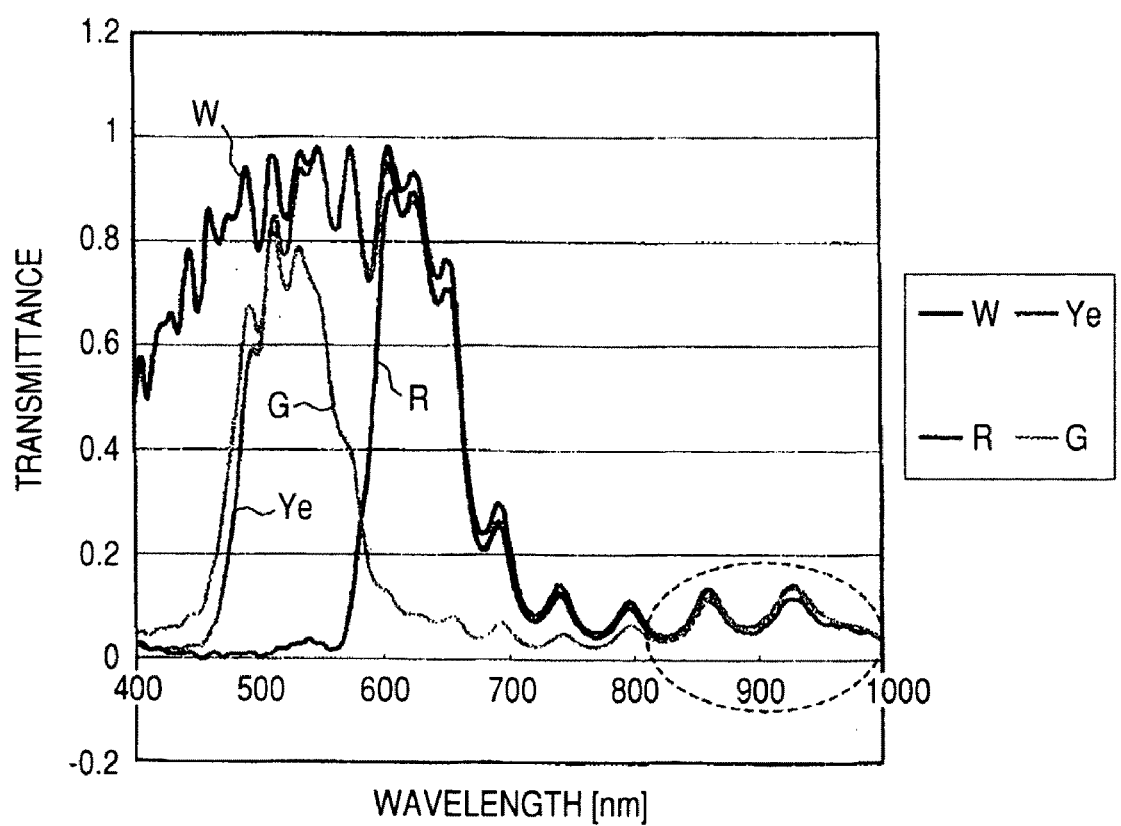
FIG. 6A is a schematic view showing a four-color arrangement example ("Ye, R, G, W")
FIG. 6B is a graph showing the color spectral characteristic of an imaging signal obtained through a four-color arrangement filter of "Ye, R, G, W"

FIG. 6A shows a four-color arrangement example ("Ye, R, G, W") of "one complementary color, two primary colors and white" of the image sensing device 2.

What matters here is the color combination, and which color component is arranged in the largest amount does not matter. Here, white (W) data is the largest in the amount of information since it is equivalent to the sum of the three primary color data (=R+G+B), and is effective, for example, in edge detection and luminance signal generation as a highly sensitive pixel signal. Therefore, it is desirable that the color of the most highly sensitive pixel be arranged in a larger amount. To increase the sensitivity, it is desirable that the white (W) pixel data be submitted to the succeeding processing without the equivalent IR component (ir) being removed therefrom.

FIG. 6B shows the spectral characteristic of the imaging signal from the image sensing device 2 (FIG. 1B) in which the color filter of "Ye, R, G, W" is provided in the on-chip and multilayer filter 2B.

The imaging signal of the illustrated spectral characteristic is obtained by imaging (photoelectrically converting) light having passed through the optical band separating filter and the color filter. However, in the spectral characteristic of the on-chip and multilayer film 2B, because of limitations of the material and thickness of the film that can be laminated on the image sensing device 2 and the lamination method, a complete interception characteristic is not obtained in the intercepted band (wavelengths of 650 to 850 nm) as shown in FIG. 3B. Therefore, as shown in FIG. 6B, in the color spectral characteristic of the imaging signal, the sensitivity to G (green) is slightly different from those to the other colors in the vicinity of wavelengths of 700 to 800 nm. However, at wavelengths of not less than the vicinity of 800 nm, a characteristic is realized in which sensitivity nonuniformity among the colors is substantially eliminated by increasing the transmittance as shown in FIG. 3B so that the characteristic of the image sensing device that the sensitivity is uniform among the colors shown in FIGS. 2A and 2B is excellently reflected.

In the present embodiment, with attention paid to this, the IR light component is canceled in the following manner among the pieces of pixel data.

After the data separating part 541 shown in FIG. 1A separates the imaging signal from the image sensing device 2 into pieces of pixel data of the colors, the infrared separating section 548 performs subtractions shown by the following expressions (1-1) to (1-3):

[Expression 1]

$$(Ye+(ir))-(G+(ir))=R \quad (1\text{-}1)$$

$$(Ye+(ir))-(R+(ir))=G \quad (1\text{-}2)$$

$$(W+(ir))-(Ye+(ir))=B \quad (1\text{-}3)$$

As is apparent from these expressions, the equivalent IR component (ir) is canceled merely by a subtraction between two colors.

On the other hand, when it is intended to extract the equivalent IR component (ir), the R data obtained by the expression (1-1) is subtracted from the pixel data (R+(ir)). Alternatively, the G data obtained by the expression (1-2) is subtracted from the pixel data (G+(ir)).

Figure 7:
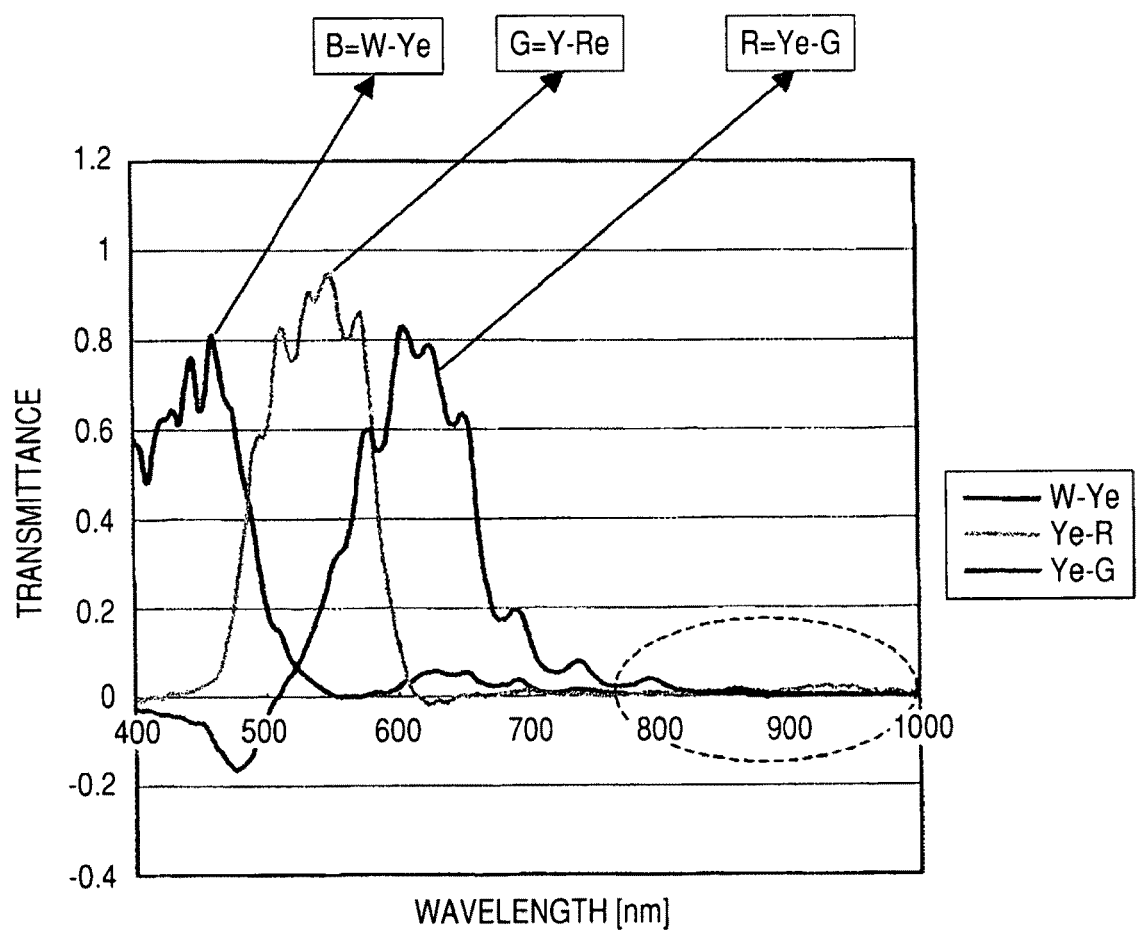
FIG. 7 is a graph showing the color spectral characteristic of three primary color data after an infrared separation computation.

FIG. 7 shows the color spectral characteristic of three primary color data after the infrared separation computation.

From FIG. 7, particularly, at wavelengths of not less than 800 nm, the IR light component is substantially completely canceled, and in the boundary region of 700 to 800 nm, the color nonuniformity is sufficiently suppressed. Humans have hardly any color sensitivity in the boundary region, and cannot directly recognize the color nonuniformity. Since the IR light component is substantially canceled, a color correction is made in which it is effectively prevented that the colors are offset to make the entire part whitish.

It is known that the on-chip and multilayer filter 2B (FIG. 1B) whose characteristic is shown in FIG. 2B typically varies depending on the production lot, the position of the image sensing device 2 on the semiconductor substrate, the positions of the pixels in the image sensing device 2, and the like. Moreover, the characteristic of the obtained imaging signal somewhat varies depending on the characteristic of the image sensing device 2 where the on-chip and multilayer filter 2B is formed and the pixel characteristic. However, the nonuniformity between adjoining pixels in one image sensing device 2 formed on one wafer is negligibly small. Therefore, the computation shown by the expressions (1-1) to (1-3) is typically effective between pieces of data between pixels of the four-color arrangement in the pixel unit.

Figure 8A:
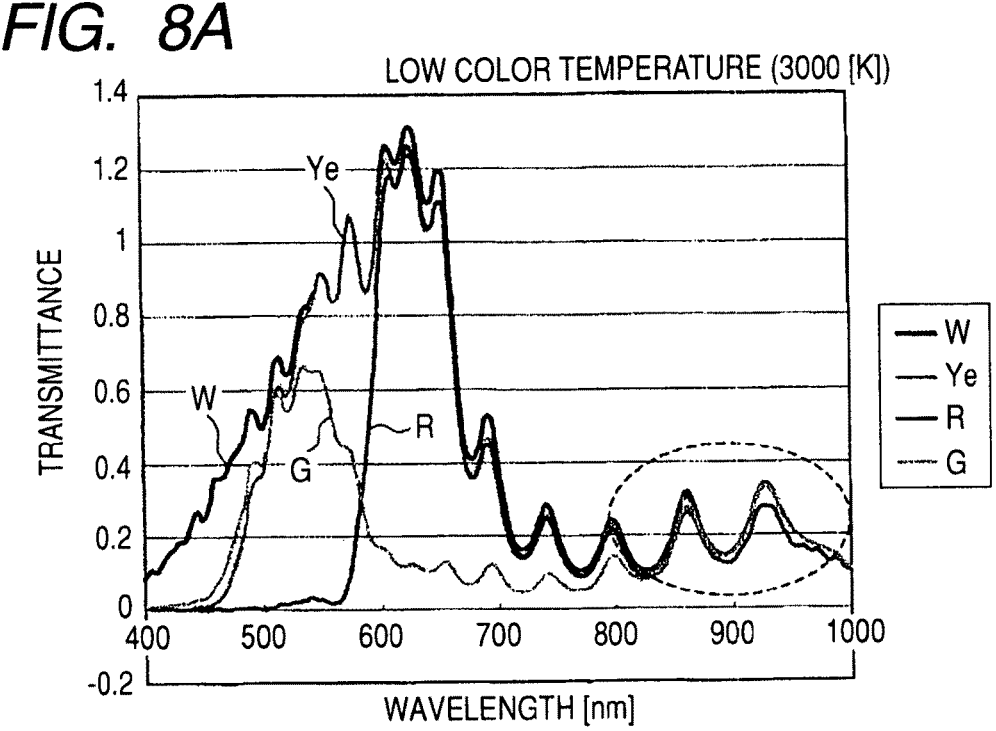
FIG. 8A is a graph showing the color spectral characteristic of an imaging signal obtained by imaging under a light source of a low color temperature (3000 K)
Figure 8B:
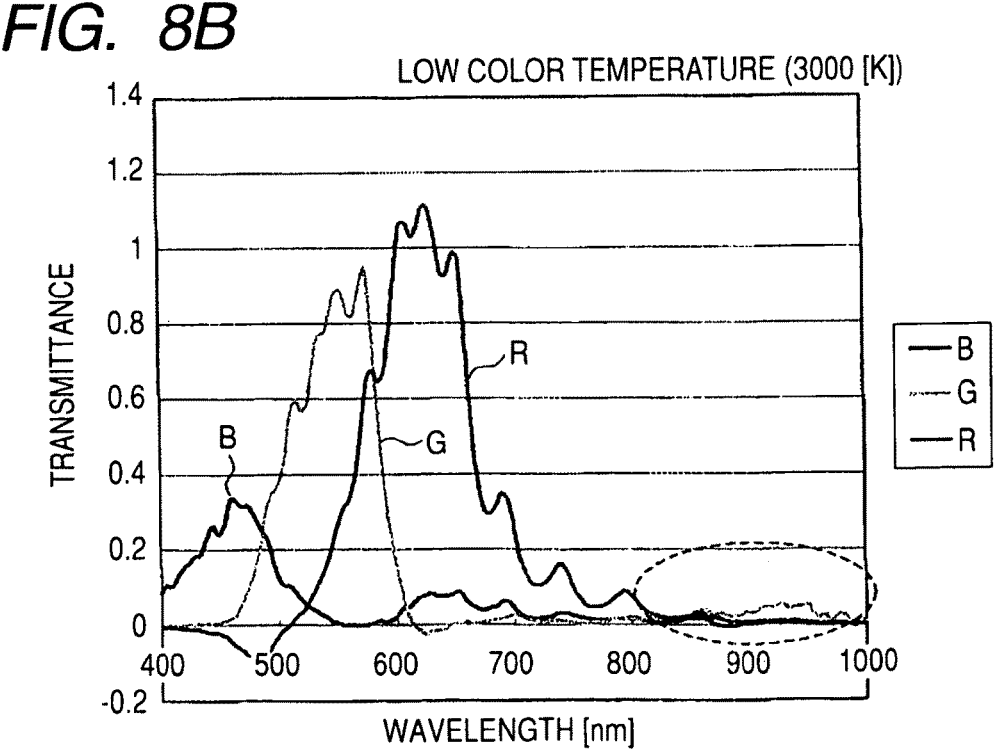
FIG. 8B is a graph showing the color spectral characteristic after data separation is performed on the imaging signal of the characteristic shown in FIG. 8A and subtractions are performed.

FIG. 8A shows the color spectral characteristic of an imaging signal obtained by imaging under a light source of a low color temperature (3000 K). FIG. 8B shows the color spectral characteristic of pixel data after the data separation is performed on the imaging signal of the characteristic shown in FIG. 8A and the subtractions by the expressions (1-1) to (1-3) are performed.

Figure 9A:
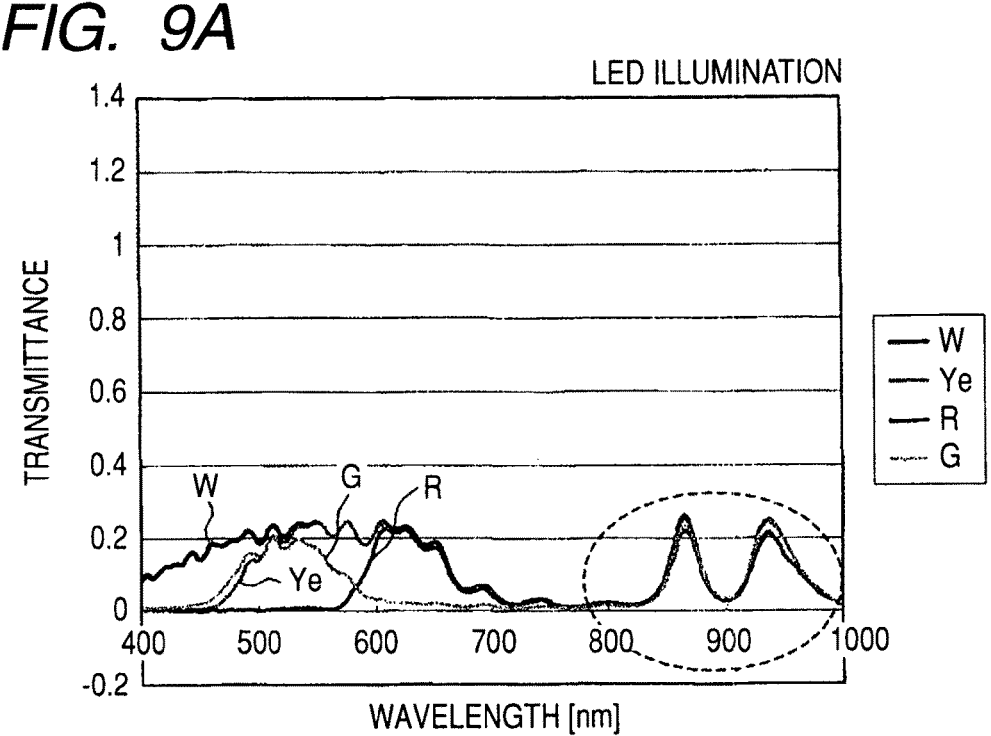
FIGS. 9A and 9B are graphs showing the color spectral characteristics of an imaging signal obtained by imaging by LED illumination corresponding to FIGS. 8A and 8B, respectively.
Figure 9B:
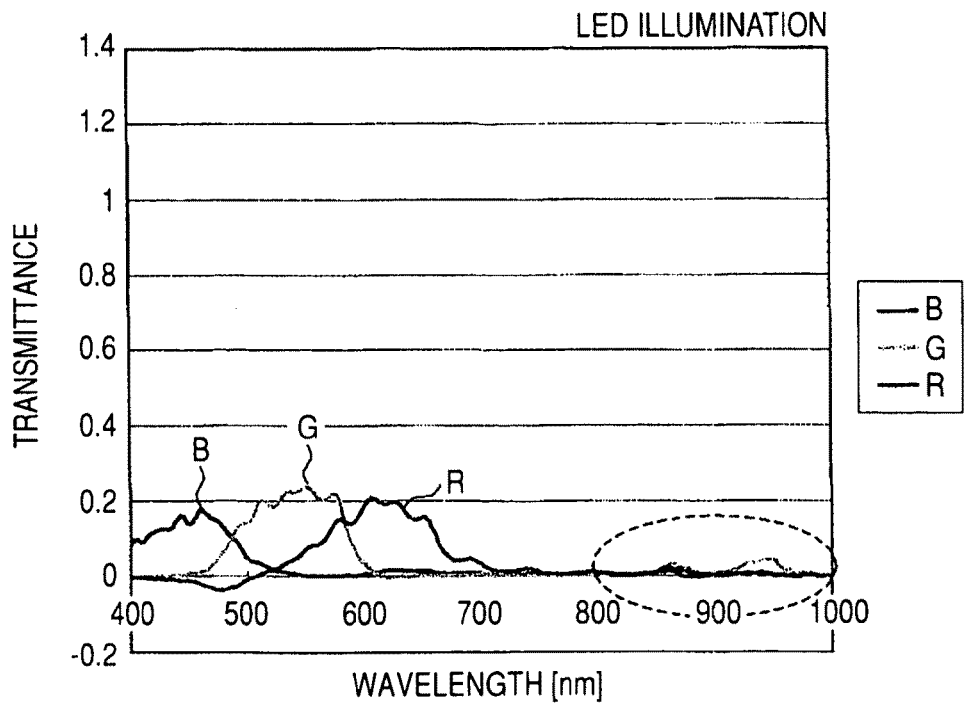

FIG. 9A shows the color spectral characteristic of an imaging signal obtained by imaging by LED illumination. FIG. 9B shows the color spectral characteristic of pixel data after the data separation is performed on the imaging signal of the characteristic shown in FIG. 9A and the subtractions by the expressions (1-1) to (1-3) are performed.

It is apparent from FIGS. 8A, 8B, 9A, and 9B that while the sensitivity of visible light largely differs according to the kind of the light source and the sensitivity level differs also in the case of near infrared light, as indicated by the dashed ellipses in the figures, the IR component of not less than approximately 800 nm can be canceled irrespective of the light source.

An application is possible in which the signal sensitivity is increased by increasing the sensitivity in visible light by illuminating the subject by using the auxiliary illumination shown in FIGS. 9A and 9B at the time of imaging under the light source of FIGS. 8A and 8B. In this case, it can also be easily inferred from FIGS. 8A, 8B, 9A, and 9B that the cancellation of the IR component works effectively.

While the above is a description of the processing for the pattern "Ye, R, G, W" as an example of the first combination "one complementary color, two primary colors and white" in the table of FIG. 4 and effects thereof, the basic of the processing and the reason for the cancellation of the IR component are common to the other color combinations although the computational expressions are different. Moreover, that the IR component can be canceled irrespective of the light source and that the cancellation of the IR component effectively works even when LED auxiliary illumination is performed are similar irrespective of the color combination.

Therefore, in the following, with respect to the other color combinations of FIG. 4, mainly, the fact that the color combinations satisfy the equivalence and computational expressions are listed, and for some color combinations, graphs of characteristics before and after the computation will be shown.

<Two Complementary Colors, One Primary Color and White>

Two complementary colors, one primary color, and one white (W) constitute the four-color arrangement. Specifically, as shown in FIG. 4, this combination includes the following six patterns: "Ye, Cy, R, W", "Ye, Cy, B, W", "Ye, Mg, G, W", "Ye, Mg, B, W", "Cy, Mg, R, W", and "Cy, Mg, G, W".

For example, in the pattern "Ye, Cy, R, W", the group of the (Cy(=B+G)+(ir)) data and the (R+(ir)) data after the pixel data separation and the (W(=R+G+B)+(ir)) data satisfy the above-mentioned equivalence since they "meet the requirement that the sum of two colors is equivalent to one other color in the visible light region". Likewise, the other five patterns meet this requirement and satisfy the equivalence.

As the computational expressions, expressions (2-1) to (2-3) shown below are used, and the equivalent IR component (ir) is canceled when three primary color data is obtained in the course of this computation. When the equivalent IR component (ir) is obtained by using the obtained primary color data, the following expression (2-4) is used, and when the equivalent IR component (ir) is obtained from the beginning without the primary color data being obtained, the following expression (2-5) using the equivalence is used:

[Expression 2]

$$(W+(ir))-(Cr+(ir))=R \quad (2\text{-}1)$$

$$(Cy+(ir))-(R+(ir))=G \quad (2\text{-}2)$$

$$(W+(ir))-(Ye+(ir))=B \quad (2\text{-}3)$$

$$(R+(ir))-R=(ir) \quad (2\text{-}4)$$

$$\{(Cy+(ir))+(R+(ir))\}-(W+(ir))=(ir) \quad (2\text{-}5)$$

<Three Complementary Colors and White>

Three complementary colors and one white (W) constitute the four-color arrangement. Specifically, as shown in FIG. 4, this combination includes the following one pattern: "Ye, Cy, Mg, W".

In the pattern "Ye, Cy, Mg, W", the group of the (Ye(=R+G)+(ir)) data, the (Cy(=B+G)+(ir)) data and the (Mg(=B+R)+(ir)) data after the pixel data separation and the (W(=R+G+B)+(ir)) data satisfy the above-mentioned equivalence since they "meet the requirement that the sum of three colors is equivalent to twice one other color in the visible light region".

The following expressions (3-1) to (3-3) are used as the computational expressions, and the equivalent IR component (ir) is canceled when three primary color data is obtained. When the equivalent IR component (ir) is obtained from the beginning without the primary color data being obtained, the following expression (3-4) using the equivalence is used:

[Expression 3]

$$(W+(ir))-(Cy+(ir))=R \quad (3\text{-}1)$$

$$(W+(ir))-(Mg+(ir))=G \quad (3\text{-}2)$$

$$(W+(ir))-(Ye+(ir))=B \quad (3\text{-}3)$$

$$[\{(Ye+(ir))+(Cy+(ir))+(Mg+(ir))\}-(W+(ir))]/2=(ir) \quad (3\text{-}4)$$

<Three Primary Colors and White>

Three primary colors and one white (W) constitute the four-color arrangement. Specifically, as shown in FIG. 4, this combination includes the following one pattern: "R, G, B, W".

In the pattern "R, G, B, W", the group of the (R+(ir)) data, the (G+(ir)) data and the (B+(ir)) data after the pixel data separation and the (W(=R+G+B)+(ir)) data satisfy the above-mentioned equivalence since they "meet the requirement that the sum of three colors is equivalent to once one other color in the visible light region".

To this color combination, the following methods may be adopted: a first method in which the equivalent IR component (ir) is obtained first and then, the equivalent IR component (ir) is canceled; and a second method in which three primary color data where the equivalent IR component (ir) is canceled is obtained by converting the three primary color data into complementary color family data of (three complementary colors and G) and then, obtaining the primary color signal from the normal complementary color family. Since the first method will be described in a second embodiment described later, the second method will be described here by referring to characteristic graphs as appropriate.

In the second method, complementary color family data is obtained first, and at this time, the expressions (4-1) to (4-3) shown below are used for three complementary color data (Ye, Cy, Mg). From these expressions, it is easily found that the equivalent IR component (ir) is canceled from the obtained three complementary color data (Ye, Cy, Mg).

[Expression 4]

$$(W+(ir))-(B+(ir))=Ye \quad (4\text{-}1)$$

$$(W+(ir))-(R+(ir))=Cy \quad (4\text{-}2)$$

$$(W+(ir))-(G+(ir))=Mg \quad (4\text{-}3)$$

Then, the remaining green (G) data of the complementary color family data is obtained by the following expression (5) by using the three complementary color data (Ye, Cy, Mg) not including the equivalent IR component (ir):

[Expression 5]

$$(Ye+Cy-Mg)/2=G \quad (5)$$

Figure 10A:
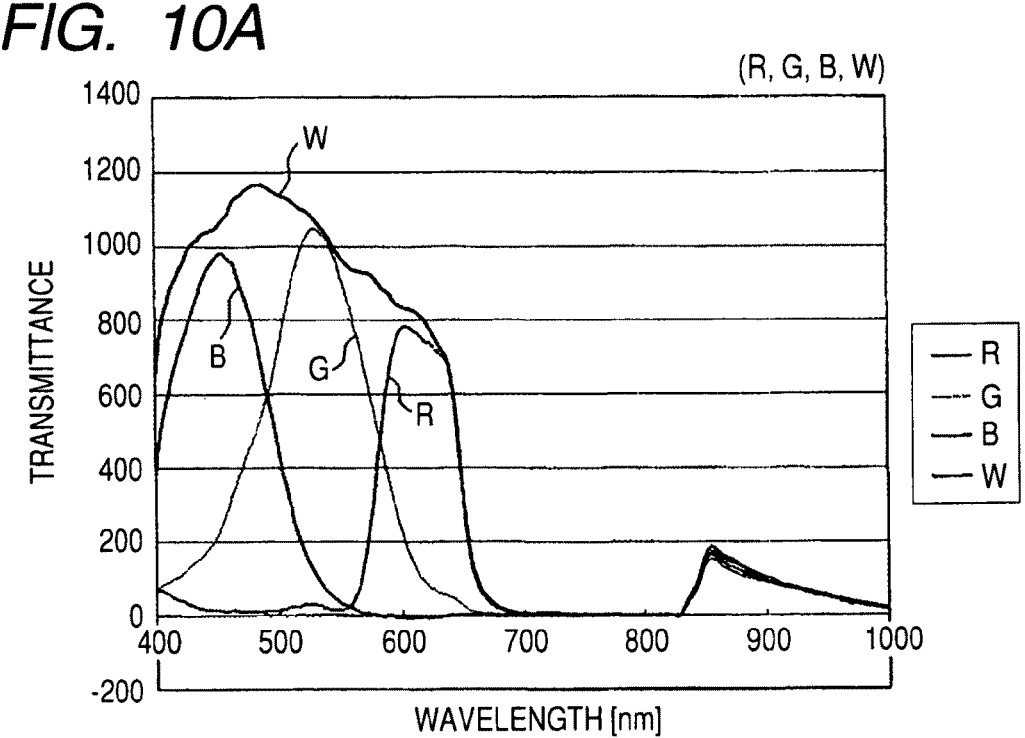
FIGS. 10A and 10B are graphs showing the color spectral characteristics before and after a computation in other color combinations.
Figure 10B:
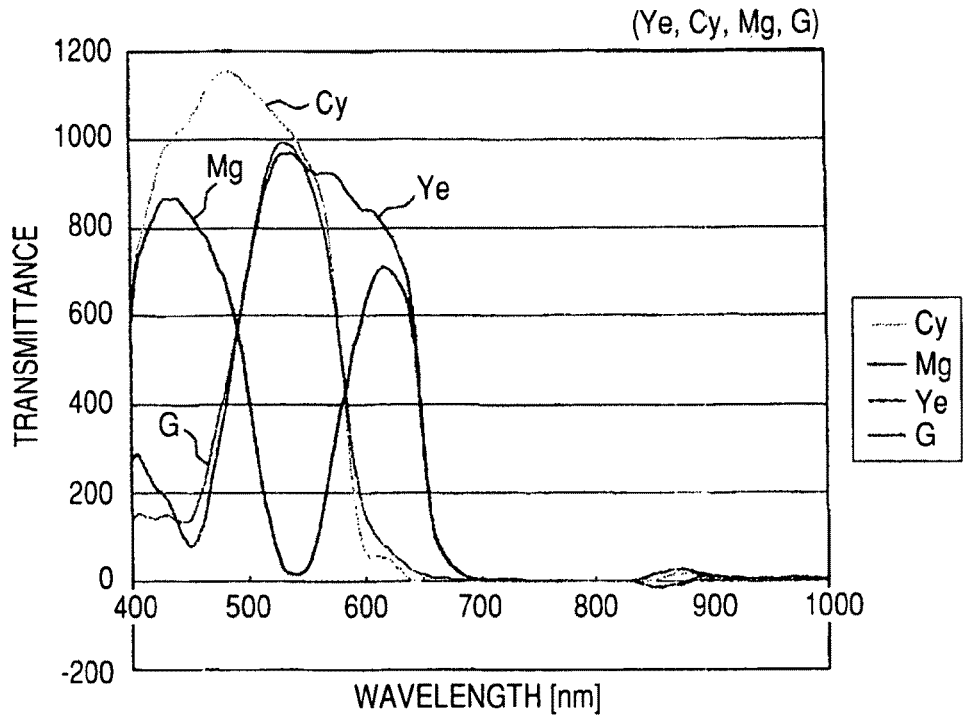

FIGS. 10A and 10B show the color spectral characteristics of pixel data before and after the computation by the expressions (4-1) to (4-3) and (5). Here, the incident light at the time when these characteristics are obtained is light from the optical band separating filter 1A disposed as an optical part. That is, as the band separation characteristic, the one shown in FIG. 3A is used.

From these figures, it is apparent that reflecting an excellent band separation characteristic, the transmittance is substantially equal to zero and the equivalent IR component (ir) is canceled at not less than the vicinity of approximately 700 nm.

Then, the three primary colors are obtained from the obtained four pieces of complementary color family data by a computation by the following expressions (6-1) to (6-3):

[Expression 6]

$$(Ye+(ir))-(G+(ir))=R \quad (6\text{-}1)$$

$$(Cy+(ir))-(G+(ir))=B \quad (6\text{-}2)$$

$$(Ye+(ir))-R=G \quad (6\text{-}3)$$

As is apparent from these expressions, the equivalent IR component (ir) is canceled by a subtraction between two colors.

On the other hand, when it is intended to extract the equivalent IR component (ir), the G data obtained by the expression (6-3) is subtracted from the pixel data (G+(ir)).

Figure 11A:
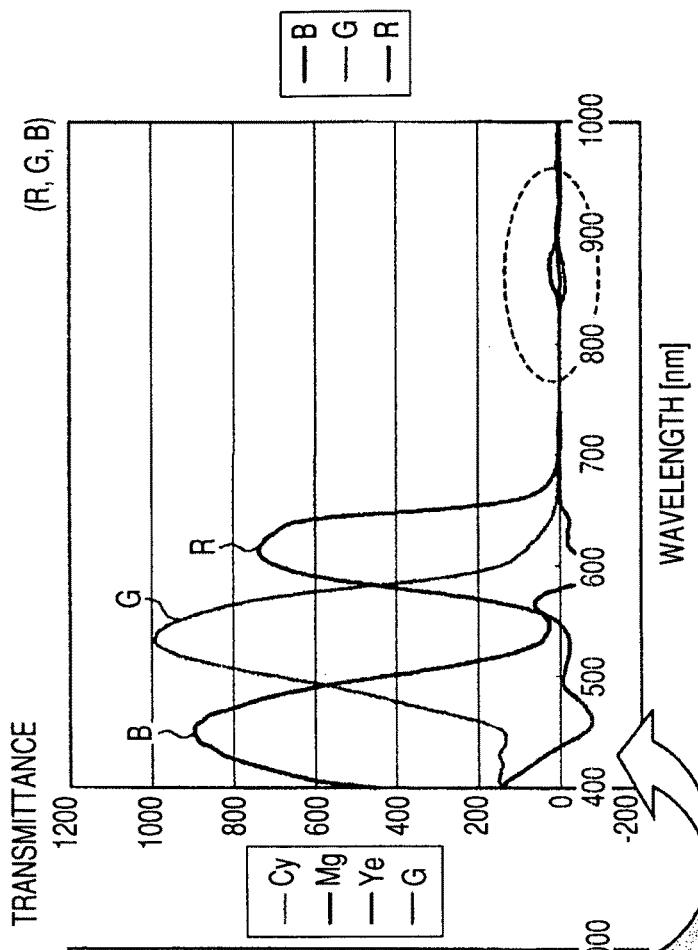
FIGS. 11A and 11B are graphs of the color spectral characteristics before and after a computation to obtain the primary color family data from complementary color family data.
Figure 11B:
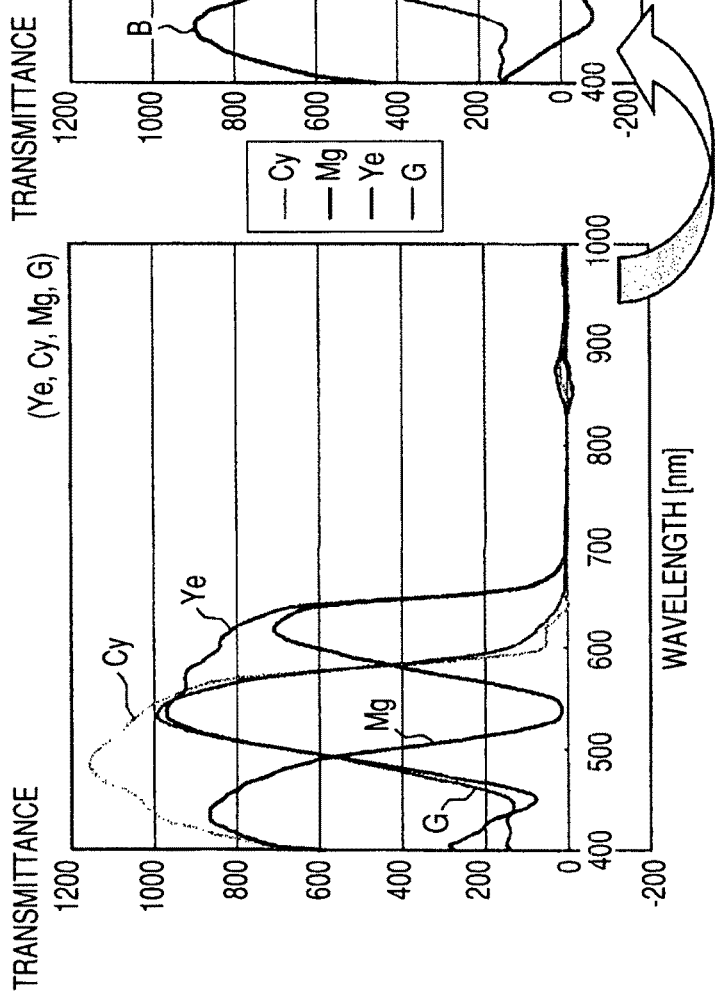

FIGS. 11A and 11B show the color spectral characteristics of pixel data before and after the computation by the expressions (6-1) to (6-3). At this time, as the band separation characteristic, the one shown in FIG. 3A is used.

From these figures, it is apparent that reflecting an excellent band separation characteristic, the transmittance is substantially equal to zero and the equivalent IR component (ir) is canceled at not less than the vicinity of approximately 700 nm.

To extract the equivalent IR component (ir) by using the obtained three primary color data, at least one of the pieces of (R, G, B) data obtained by the expressions (6-1) to (6-3) shown in FIG. 12(A2) is subtracted from the {R+(ir), G+(ir), B+(ir)} data after the data separation shown in FIG. 12(A1). Thereby, only the equivalent IR component (ir) can be extracted as shown in FIG. 12B.

The above is a description of a preferred case in which white (W) is included in the four-color arrangement.

Next, the other color combinations not including white (W) shown in FIG. 4 will be briefly described.

<One Complementary Color and Three Primary Colors>

This color combination includes the three patterns shown in FIG. 4. For example, in the pattern "Ye, R, G, B", the group of the (R+(ir)) data and the (G+(ir)) data, and the (Ye (=R+G)+(ir)) data satisfy the above-mentioned equivalence since they "meet the requirement that the sum of two colors is equivalent to one other color in the visible light region".

In the computation, for example, R and G are obtained by the previously-shown expressions (1-1) and (1-2), (ir) is obtained from the difference between the {(R+(ir))+(G+(ir)) data and the (Ye+(ir)) data, and this is subtracted from the (B+(ir)) data to thereby obtain the B data.

<Two Complementary Colors and Two Primary Colors>

This color combination includes, for example, "Ye, Cy, G, R" as shown in FIG. 4, and in this example, the group of the (R+(ir)) data and the (G+(ir)) data, and the (Ye(=R+G)+(ir)) data satisfy the above-mentioned equivalence since they "meet the requirement that the sum of two colors is equivalent to one other color in the visible light region".

Examples of the computation include a method in which (ir) is obtained from an expression {(G+(ir))+(B+(ir))}−(Cy+(ir)) and a method in which after the G data and the R data are obtained first, (ir) is extracted as in the case of <one complementary color and three primary color>.

<Complementary Color Family>

This can be obtained by the expressions (6-1) to (6-3), and the equivalent IR component (ir) can be extracted similarly.

However, when the color filter is a complementary color family filter from the beginning, the above-mentioned equivalence is not satisfied.

In the present embodiment, from the spectral characteristics of the image sensing device shown in FIGS. 2A and 2B, when the computation to obtain the primary color data of R, G, and B is performed, the near infrared leakage light component can be canceled by using the fact that the spectral curve of not less than a predetermined wavelength is a subsequently equivalent distribution configuration for the spectrum of each color component. At this time, by using in combination an optical band separating filter that intercepts a wavelength region where the sensitivities of the color filters in the near infrared light region are not equivalent (for example, 650 to 850 nm) and transmits the band on the shorter wavelength side thereof and the band on the longer wavelength side thereof and a color filter of the four-color arrangement holding the above-mentioned equivalence, three primary color data can be outputted from which the IR component is efficiently and accurately removed by an extremely simple computation.

Moreover, according to the present embodiment, a camera can be provided in which an image containing only the IR component can be obtained by subtracting the visible light component extracted in the above-described infrared separation processing, from the imaging signal containing the IR component, and "visible light" and an "IR image" can be separated and obtained with one image sensing device.

Although not specifically shown, means for detecting information on the brightness of the imaging plane for a predetermined camera control processing is provided, for example, in the signal processing section 4 of the camera shown in FIG. 1A. Examples of the predetermined camera control processing include white balance correction performed among the primary color data of R, G, and B color-corrected by the infrared separation and exposure control performed by the diaphragm of the optical part 1 and the control circuit therefor.

Hereinafter, integration values will be described that are obtained by detecting the brightness of the imaging plane and integrating, for example, one image plane of pixel data values for each color by the control by the microcomputer 10.

<<Color Component Detection After Data Separating Section>>

FIG. 13C shows a structure that detects the pixel data between the data separating section 541 and the infrared separating section 548 shown in FIG. 1A and integrates it for each color component. FIGS. 13A and 13B are graphs of the color spectral characteristics each showing a case where the ratio of the IR component in the pixel data is different, for comparison between when the color temperature of the light source is 5000 K and when it is 2400 K.

Referring to FIGS. 13A and 13B, the detection when the number of data integration parts is one and its inconvenience will be described. For this purpose, it is assumed that the color filter structure (color arrangement) is "R, G1, G2, B" as shown in FIG. 13C. Although the color filter in the present embodiment adopts the four-color arrangement shown in FIG. 4, the color arrangement "R, G1, G2, B" is used for only the description of the data integration part for the sake of convenience.

The integrating section (first integrating section) 61 shown in FIG. 13C includes an integrating section for each color (four integrating sections in this example), and integrates, for example, one image plane of pixel data for each color separated by the data separating section 541, by the corresponding integrating section. The pixel data inputted to each integrating section contains the IR component since it has not undergone the infrared separation yet. The integration value (first integration value) of each color from the first integrating section 61 is outputted to a non-illustrated camera control processing section, and submitted to the processing concerned (for example, exposure control or white balance correction).

The pixel data inputted to each integrating section contains the IR component since it has not undergone the infrared separation yet, and the ratio of the IR component largely varies according to the subject whose image is taken or the image taking environment (in particular, the color temperature of the light source).

Specifically, under the light source with a color temperature of 5000 K shown in FIG. 13A, the ratio of the IR component is as low as approximately 25%, whereas under the light source with a color temperature of 2400 K shown in FIG. 13B, the ratio of the IR component reaches as high as 73%. Although the band is cut at wavelengths of 700 to 800 nm by the optical band separating filter 1A shown in FIG. 1A or the like in FIGS. 13A and 13B, since the first integrating section 61 calculates the integration value at all the wavelengths, the ratio of the IR component sometimes largely differs according to the environment even with a similar integration value.

When the camera control processing is exposure control, the exposure of the camera is controlled by the diaphragm or the like so that the brightness (light amount) of the input image to the image sensing device 2 is a given appropriate value. At that time, as the brightness of the input image plane, for example, the compound value of four integration values is used.

Therefore, if exposure control is performed based on only the integration values from the first integrating section 61, when visible light and IR light are separated by the infrared separating section 548 (FIG. 1A) thereafter, the visible light component is significantly smaller than an appropriate value if image taking is performed under a condition where the light source contains a large amount of IR light (for example, when the color temperature is low corresponds to this), so that the display screen becomes dark.

Cameras typically have the function of adjusting the gain when the image plane is dark. When this gain adjustment works, a comparatively small amount of visible light component is multiplied by a high amplification factor (gain) to increase the output signal level to an appropriate level. This results in an extremely low S/N ratio.

On the other hand, when the camera control processing is white balance correction, the gain amplifier control amount (color gain value) for each color is necessarily determined for white balance. The color gain value is determined, for example, by the microcomputer 10 based on the ratio among the outputs of the integrating sections for the colors included in the first integrating section 61 shown in FIG. 13C.

However, since the integration values obtained by the first integrating section 61 contain the IR component as a predetermined offset, the ratio among the integration values of the colors is not the same as an appropriate ratio.

Explaining this with a concrete example, for example, when the color temperature of the light source is 5000 K (FIG. 13A), in terms of the visible light component, the color gain values by which the pieces of pixel data of blue (B) and red (R) are to be multiplied with reference to G is 1.33 (B) and 1.25 (R), respectively.

However, if the color gain is obtained from the integration values of the pixel data containing the IR component, the color gain values are actually 1.22 (B) and 1.13 (R), which are shifted from the appropriate gain values. Thus, there is an inconvenience that the image part that is to be white is not achromatic white even though white balance correction is made.

Further, if the amount of IR component is large, the optical sensor section is readily saturated particularly at pixels of a specific color where the amount of information in the output is large. If color saturation occurs, by the brightness detection (the acquisition of the integration values) by using only the pixel data containing the IR component, the camera control processing can be no longer performed with accuracy since correct integration values are not obtained.

To prevent the above-mentioned inconvenience, in the camera of the present embodiment, in addition to the first integrating section 61, a second integrating section 62 is provided on the output side of the infrared separating section 548 in the signal processing section 4.

Figure 14:
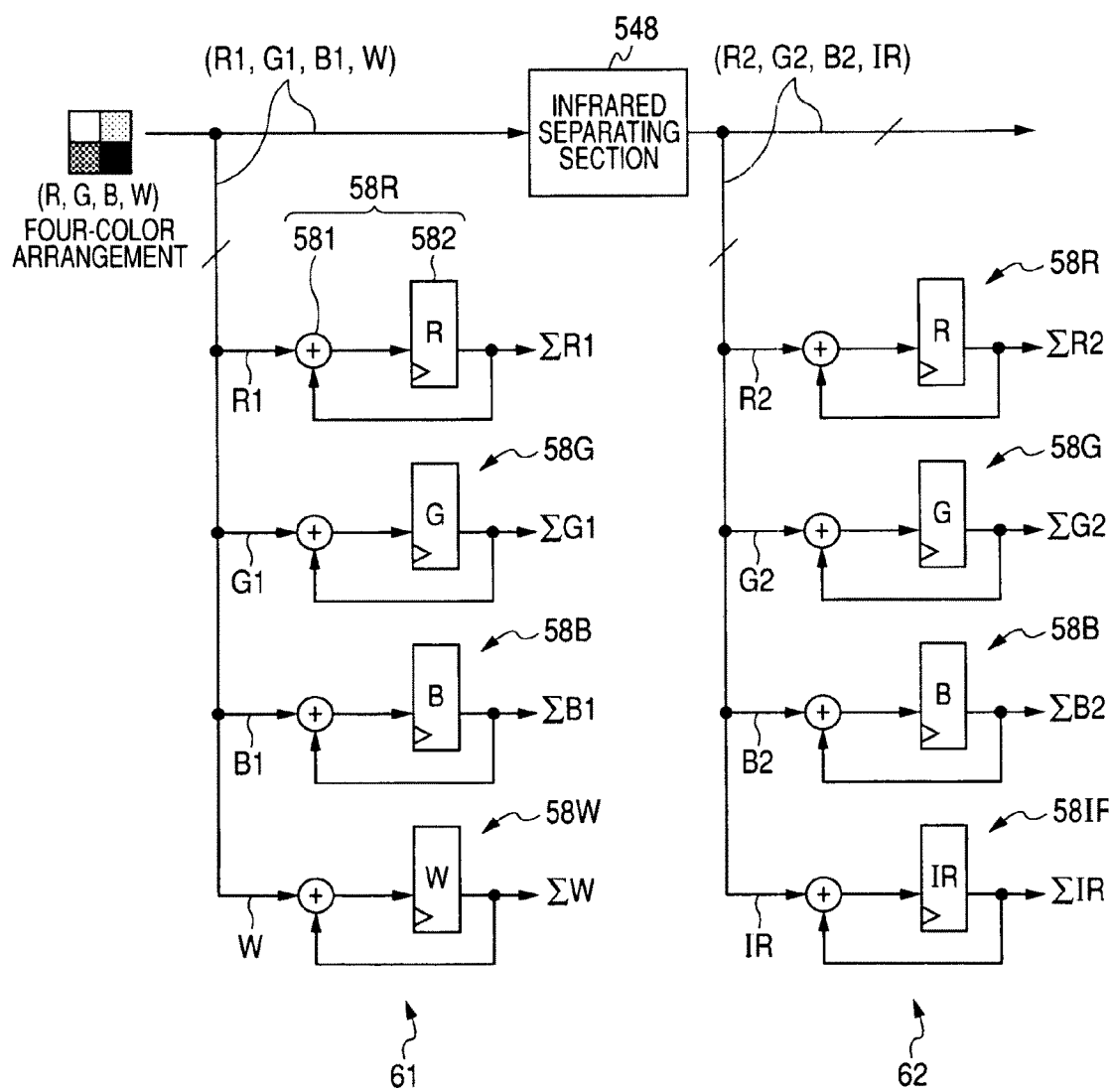
FIG. 14 is a view showing the arrangement and structure of the first integrating section 61 and a second integrating section 62.

FIG. 14 shows the structure of the two integrating sections (the first integrating section 61 and the second integrating section 62) and the connection relation with the infrared separating section 548.

The first integrating section 61 is provided on the preceding stage of the infrared separating section 548, and has a color integrating section 58R that integrates R1 data, a color integrating section 58G that integrates G1 data, a color integrating section 58B that integrates B1 data, and a color integrating section 58W that integrates W data. Here, the input data is, as shown in the figure, four pieces of data (R1, G1, B1, W) outputted from the image sensing device 2 of the four-color arrangement of (R, G, B, W), having undergone predetermined processings, and separated by the separating section 541 of FIG. 1A.

Since the input to the first integrating section 61 is the data not having undergone the separation into the IR component and the visible light component yet, the magnitude of the light reception component of all the wavelengths containing the IR component and the visible light component is detected, and integration values $\Sigma R1$, $\Sigma G1$, $\Sigma B1$, and $\Sigma W$ (hereinafter, these will be referred to as the first integration values) are outputted.

The second integrating section 62 is provided on the succeeding stage of the infrared separating section 548, and has a color integrating section 58R that integrates R2 data obtained by performing infrared separation on the R1 data, a color integrating section 58G that integrates G2 data obtained by performing infrared separation on the G1 data, a color integrating section 58B that integrates B2 data obtained by performing infrared separation on the B1 data, and an IR integrating section 58IR that integrates the IR data obtained by infrared separation. Here, the input data is, as shown in the figure, (R2, G2, B2) data of three primary colors from which the IR component has been removed based on (R, G, B, W) data, and the IR data.

The second integrating section 62 detects the magnitude of the IR component or the visible light component after the separation, and outputs integration values $\Sigma R2$, $\Sigma G2$, $\Sigma B2$, and $\Sigma IR$ (hereinafter, these will be referred to as second integration values).

FIG. 15 schematically shows a priority determining method of the camera control processing performed by using the first integrating section 61 and the second integrating section 62.

The microcomputer 10 in the camera control processing section calculates a parameter K by using the calculated first and second integration values. The parameter K is a variable related to the magnitude of the IR component and the magnitude of the visible light component, and may be defined arbitrarily as long as it is based on a relational expression that varies so as to increase or decrease as the ratio of the IR component increases. Here, the parameter K is defined as a variable that takes on "1" in the case of only the IR component where the ratio of the IR component is 100%, and takes on "0" in the case of only the visible light component.

In FIG. 15, the horizontal axis represents the parameter K, and the vertical axis represents an index indicating which of the outputs of the first integrating section 61 and the second integrating section 62 is used with priority. This index is called "succeeding detector priority" here. When its value is "1", the second integration values from the second integrating section 62 are used for the control, and when it is "0", the first integration values from the first integrating section 61 are used for the control.

As is apparent from this figure, in many cases, control (of exposure and the like) is performed with priority given to visible light. That is, camera control is performed by using the first integration values from the first integrating section 61.

When the parameter K is higher than a somewhat low value "k1", regarding the input light as mostly the IR component, control of exposure or the like in which priority is given to IR is performed. Specifically, exposure control using the IR data is performed, or control of exposure or the like using the input pixel data regarded as equivalent to the IR component is performed.

For example, when the ratio (IR component ratio) between the value (input) obtained by the first integrating section 61 and the value obtained by the second integrating section 62 is calculated and the ratio between the input and the IR component is close to "1", since this means that the object to be photographed contains only light of the IR component, the IR priority exposure control is performed so that an IR image is taken.

When the parameter K is less than "k2(<k1)", control is returned to the visible light priority control.

For example, when the value of the IR component is low with respect to the input conversely, since it can be assumed that a subject in which infrared light is not contained and visible light is sufficiently bright is imaged, for visible light photographing, it is desirable to perform exposure control so that the brightness of the visible light component after the IR and visible light separation processing becomes appropriate.

The reason for providing hysteresis in the control as described above is to prevent the control mode from being frequently switched.

<<High-Frequency Component Detection>>

In addition to the above-described structure, in the present embodiment, the second integrating section 62 may be modified so that high-frequency component detection can be performed.

In photographing in a foggy or smoky environment, it is common practice to switch the photographing mode (for example, the AE program mode) by a user operation.

Even when objects such as scenery and roads behind the subject are not seen with "visible light" because of light being intercepted by the fog or smoke, the objects behind the subject are easily seen through the fog or smoke in an environment with much "IR light" or by intentionally applying infrared light.

When the objects such as scenery and roads are seen, the amount of high-frequency component is relatively large since a larger number of edges are included, and when they are not seen, the amount of high-frequency component is small.

If this characteristic is used, the following is possible: The ratio of the high-frequency component is obtained for each of the visible light component and the IR component, and when there is a difference therebetween, that is, when the high-frequency component ratio in the IR data is higher than that in the visible light data, assuming that the environment is foggy or smoky, the control is automatically switched to the IR priority control.

This modification relates to the structure and operation for automatic switching control.

FIG. 16A shows a structure for high-frequency component detection. In this figure, elements common to those of FIG. 14 are denoted by the same reference designations.

One high-pass filter (HPF) 63 as a high frequency detector is connected for each of the colors and IR between the second integrating section 62 and the infrared separating section 548. For this reason, the color integrating sections 58R, 58G, and 58B and the IR integrating section 58IR included in the second integrating section 62 each integrate, for example, one image plane of high frequency component of the input data, and output the result as the second integration value. The second integration value is sent to the microcomputer 10 not shown, and the microcomputer 10 determines whether to switch the mode or not.

The HPF 63 may be formed of, for example, a Laplacian filter, and an example of the filter coefficient set in that case is shown in FIG. 16B.

FIG. 17A shows an example of the visible light image monitored by a vehicle-mounted camera when it is foggy. FIG. 17B shows an example of the monitor image when high frequency detection is performed on the same visible light image. FIG. 17C shows the visibilities (viewable distances) in the cases of visible light, near infrared light, and far infrared light for comparison between when the visibility meter values are 20 m and 50 m in a foggy environment and when it is not foggy.

As shown in FIG. 17C, when it is foggy, the visibility in the case of near infrared light is a little less than twice to a little more than three times that in the case of visible light. This is because when it is foggy, although the amount of high-frequency component is small since visibility is low with visible light, since infrared light is high in transmittance even in fog and can be seen by an infrared camera, an image is outputted when the HPF is applied with the infrared component.

FIG. 18 shows an example of control.

The horizontal axis represents the IR light component ratio of the high-frequency component to visible light, and the lateral axis represents the priority of use of the integration values of visible light and IR light. The use priority may be considered as the difference of the photographing mode.

The ratio between the high-frequency component of IR and the high-frequency component of visible light is obtained here. When the amount of IR component is large and the amount of visible light component is small in the ratio, it is determined that photographing is performed in a foggy environment, and switching to IR photographing (brightness determination using the IR component) is made. However, since such a state similarly occurs when IR illumination is provided at night, if necessary, the condition may be such that "although visible light is bright, it contains no high-frequency component and IR contains a large amount of high-frequency component".

By the above-described structure, a necessary one of visible light and IR light can be imaged at correct exposure.

It should be understood by those skilled in the art that various modifications, combinations, sub-combinations and alterations may occur depending on design requirements and other factors insofar as they are within the scope of the appended claims or the equivalents thereof.

What is claimed is:

1. An image input processing apparatus comprising:
an optical band separating filter that intercepts a predetermined wavelength band of near infrared light, and transmits bands on shorter and longer wavelength sides of the predetermined wavelength band;
a color filter of a four-color arrangement having an equivalence in which a sum of two colors is equivalent to one other color in a visible light region or a sum of three colors is equivalent to once or twice one other color in the visible light region;
an optical sensor section that receives light having undergone wavelength band separation and color selection by way of the optical band separating filter and the color filter, for each color with a pixel as a unit, and generates an imaging signal;

a data separating section that separates pixel data, corresponding to the four-color arrangement, of the imaging signal into pieces of pixel data of four colors;

an infrared separating section that separates a near infrared light component, in the longer wavelength side band, separated by the optical band separating filter, from the pixel data by a subtraction using the equivalence in the visible light region based on the four-color arrangement among the pieces of pixel data of the four colors after the separation;

a first integrating section that integrates, for each color, a plurality of pieces of pixel data that are outputted from the data separating section and have not been inputted to the infrared separating section yet;

a second integrating section that integrates, for each color, a plurality of pieces of pixel data outputted from the infrared separating section; and a camera control processing section that compares a first integration value of each color from the first integrating section with a second integration value of each color from the second integrating section, and performs a camera control processing suitable for each image depending on the amount of the near infrared light component, based on a result of the comparison.

2. The image input processing apparatus according to claim 1,
wherein the first and second integrating sections each include a color integrating section that obtains a color integration value for each color, and
the second integrating section includes the color integrating section that obtains the color integration value for each color and an IR integrating section that obtains an integration value (IR integration value) of the near infrared light component extracted by the infrared separating section.

3. The image input processing apparatus according to claim 1,
wherein the first and second integrating sections each include a color integrating section that obtains a color integration value for each color, and
the camera control processing section calculates an integration value of the near infrared light component from a difference between the first integration value and the second integration value for a predetermined color.

4. The image input processing apparatus according to claim 2 or 3,
wherein the camera control processing section calculates a parameter related to a magnitude of the near infrared light component or a ratio of the near infrared light component contained in the pixel data based on the IR integration value, and determines from which of the first and second integrating sections the color integration value used for the camera control processing is obtained, according to the parameter.

5. The image input processing apparatus according to claim 2 or 3,
wherein the camera control processing section calculates a parameter related to a magnitude of the near infrared light component or a ratio of the near infrared light component contained in the pixel data based on the IR integration value, mixes the two color integration values obtained from the first and second integrating sections at a ratio corresponding to the parameter, and uses the mixture of the color integration values as the color integration value used for the camera control processing.

6. The image input processing apparatus according to claim 1,
wherein a high-frequency component extracting section is provided between each of the color integrating sections, for the colors, of the second integrating section and the infrared separating section, and a high-frequency component of the pixel data from which the near infrared light component has been removed is integrated for each color by the color integrating section.

7. The image input processing apparatus according to claim 1,
wherein a high-frequency component extracting section is provided between each of the color integrating sections, for the colors, of the second integrating section and the infrared separating section and between the IR integrating section and the infrared integrating section, a high-frequency component of the pixel data from which the near infrared light component has been removed is integrated for each color by the color integrating section, and the infrared light component is integrated by the IR integrating section.

8. The image input processing apparatus according to claim 4,
wherein the camera control processing section monitors the color integration value from the color integrating section and the IR integration value from the IR integrating section, and determines that the color integration value used for the camera control processing is obtained from the second integrating section irrespective of the parameter when the IR integration value exceeds a predetermined level or a predetermined ratio to all the integration values.

9. The image input processing apparatus according to claim 5,
wherein the camera control processing section monitors the color integration value from the color integrating section and the IR integration value from the IR integrating section, and determines the ratio in the integration value mixing so that the color integration value used for the camera control processing is obtained from only the second integrating section irrespective of the parameter when the IR integration value exceeds a predetermined level or a predetermined ratio to all the integration values.

10. An image input processing apparatus comprising:
an optical band separating filter that intercepts a predetermined wavelength band of near infrared light, and transmits bands on shorter and longer wavelength sides of the predetermined wavelength band;
a color filter of four complementary color family colors (Ye, Cy, Mg, G);
an optical sensor section that receives light having undergone wavelength band separation and color selection by way of the optical band separating filter and the color filter, for each color with a pixel as a unit, and generates an imaging signal;
a data separating section that separates pixel data, corresponding to the four complementary color family colors, of the imaging signal for each color;
an infrared separating section that separates a near infrared light component, in the longer wavelength side band, separated by the optical band separating filter, from the pixel data by performing a subtraction among pieces of pixel data of the four colors after the separation;
a first integrating section that integrates, for each color, a plurality of pieces of pixel data that are outputted from the data separating section and have not been inputted to the infrared separating section yet;

a second integrating section that integrates, for each color, a plurality of pieces of pixel data outputted from the infrared separating section; and a camera control processing section that compares a first integration value of each color from the first integrating section with a second integration value of each color from the second integrating section, and performs a camera control processing suitable for each image depending on the amount of the near infrared light component, based on a result of the comparison.

11. An image input processing method comprising the steps of:

intercepting a predetermined wavelength band of near infrared light for incident light, and transmitting bands on shorter and longer wavelength sides of the predetermined wavelength band;

selecting a color of the incident light by a color filter of a four-color arrangement having an equivalence in which a sum of two colors is equivalent to one other color in a visible light region or a sum of three colors is equivalent to once or twice one other color in the visible light region, and imaging the light having undergone the color selection, with a pixel for each color;

separating an imaging signal obtained by the imaging, into pieces of pixel data of colors;

integrating the pieces of pixel data of the colors obtained by the separation, for each color;

separating a near infrared light component in the longer wavelength side band by a subtraction using the equivalence in the visible light region based on the four-color arrangement among the pieces of pixel data of the colors;

integrating the pieces of pixel data having undergone the infrared light separation, for each color;

comparing a first integration value of each color obtained by the step of integrating the pieces of pixel data of the colors obtained by the separation with a second integration value of each color obtained by the step of integrating the pieces of pixel data having undergone the infrared light separation; and performing a camera control processing suitable for each image depending on the amount of the near infrared light component, based on a result of the comparison.

12. An electronic apparatus comprising:

an optical band separating filter that intercepts a predetermined wavelength band of near infrared light, and transmits bands on shorter and longer wavelength sides of the predetermined wavelength band;

a color filter of a four-color arrangement having an equivalence in which a sum of two colors is equivalent to one other color in a visible light region or a sum of three colors is equivalent to once or twice one other color in the visible light region;

an optical sensor section that receives light having undergone wavelength band separation and color selection by way of the optical band separating filter and the color filter, for each color with a pixel as a unit, and generates an imaging signal;

a data separating section that separates pixel data, corresponding to the four-color arrangement, of the imaging signal into pieces of pixel data of four colors;

an infrared separating section that separates a near infrared light component, in the longer wavelength side band, separated by the optical band separating filter, from the pixel data by a subtraction using the equivalence in the visible light region based on the four-color arrangement among the pieces of pixel data of the four colors after the separation;

a first integrating section that integrates, for each color, a plurality of pieces of pixel data that are outputted from the data separating section and have not been inputted to the infrared separating section yet;

a second integrating section that integrates, for each color, a plurality of pieces of pixel data outputted from the infrared separating section; and a control processing section that compares a first integration value of each color from the first integrating section with a second integration value of each color from the second integrating section, and performs a control processing suitable for each image depending on the amount of the near infrared light component, based on a result of the comparison.

* * * * *